(12) United States Patent
Kida et al.

(10) Patent No.: US 11,228,096 B2
(45) Date of Patent: Jan. 18, 2022

(54) POSITION DETECTING DEVICE INCLUDING ANTENNA FUNCTION AND DISPLAY DEVICE

(71) Applicant: SHARP KABUSHIKI KAISHA, Sakai (JP)

(72) Inventors: Kazutoshi Kida, Sakai (JP); Takenori Maruyama, Sakai (JP); Takuma Yamamoto, Sakai (JP); Yasuhiro Sugita, Sakai (JP); Shinji Yamagishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 52 days.

(21) Appl. No.: 16/917,825

(22) Filed: Jun. 30, 2020

(65) Prior Publication Data

US 2021/0005960 A1 Jan. 7, 2021

Related U.S. Application Data

(60) Provisional application No. 62/870,523, filed on Jul. 3, 2019.

(51) Int. Cl.
*H01Q 1/22* (2006.01)
*H01Q 1/32* (2006.01)
(Continued)

(52) U.S. Cl.
CPC ........... *H01Q 1/3233* (2013.01); *G06F 3/046* (2013.01); *G06F 3/0412* (2013.01); *G06F 3/0446* (2019.05); *H01Q 1/2216* (2013.01); *H01Q 1/38* (2013.01); *H01Q 1/44* (2013.01); *H01Q 9/045* (2013.01); *G06F 2203/04112* (2013.01)

(58) Field of Classification Search
CPC ........ H01Q 1/3233; H01Q 9/045; H01Q 1/38; H01Q 7/00; H01Q 1/44; G06F 3/0412; G06F 3/046; G06F 3/0416; G06F 2203/04107; G06F 3/0446; G06F 2203/04112; G06F 3/044; G06F 2203/04111
See application file for complete search history.

(56) References Cited

U.S. PATENT DOCUMENTS 9,178,572 B1* 11/2015 Zhang ................. H04B 5/0012
2014/0176819 A1* 6/2014 Yilmaz ................ G06F 3/0446
349/12

(Continued)

FOREIGN PATENT DOCUMENTS

WO 2018/062245 A1 4/2018

*Primary Examiner* — David E Lotter
(74) *Attorney, Agent, or Firm* — ScienBiziP, P.C.

(57) ABSTRACT

A position detecting device including an antenna function includes a plurality of first position detection electrodes, a plurality of second position detection electrodes, a position detection circuit, a plurality of first antenna electrodes disposed adjacent to the plurality of first position detection electrodes and separated by first spaces, a plurality of second antenna electrodes disposed adjacent to the plurality of second position detection electrodes and separated by second spaces, and an antenna circuit configured to perform wireless communication by energizing the plurality of first antenna electrodes and the plurality of second antenna electrodes and using magnetic fields generated in the first spaces and the second spaces.

12 Claims, 17 Drawing Sheets

(51) Int. Cl.
*H01Q 9/04* (2006.01)
*G06F 3/041* (2006.01)
*G06F 3/046* (2006.01)
*H01Q 1/38* (2006.01)
*G06F 3/044* (2006.01)
*H01Q 1/44* (2006.01)

(56) References Cited

U.S. PATENT DOCUMENTS

2016/0328057 A1* 11/2016 Chai ..................... H01Q 1/243
2020/0033968 A1 1/2020 Yamagishi et al.

* cited by examiner

POSITION DETECTING DEVICE INCLUDING ANTENNA FUNCTION AND DISPLAY DEVICE

CROSS-REFERENCE TO RELATED APPLICATION

The present application claims priority to U.S. Provisional Application Ser. No. 62/870,523, filed Jul. 3, 2019, the content to which is hereby incorporated by reference into this application.

BACKGROUND OF THE INVENTION

1. Field of the Invention

The present disclosure relates to a position detecting device including an antenna function, and a display device.

2. Description of the Related Art

The touch panel display including an antenna described in International Publication WO 2018/062245 below is a known example of a touch panel display including an antenna. The touch panel display including an antenna described in International Publication WO 2018/062245 includes an antenna that reads out information by using near field wireless communication. The touch panel display including an antenna includes a first substrate, a second substrate, a display medium layer sandwiched between the first substrate and the second substrate, and a first touch sensor electrode provided on the display medium layer side of the first substrate. The antenna and a second touch sensor electrode are formed on the same layer on a surface of the first substrate opposite the display medium layer.

SUMMARY OF THE INVENTION

In the touch panel display including an antenna described above in International Publication WO 2018/062245, a sensing electrode, which is the second touch sensor electrode, has an elongated shape that extends in one direction. Antenna wiring disposed on the same layer as the sensing electrode and forming an antenna pattern has an elongated shape that extends parallel to the extension direction of the sensing electrode. The magnetic field generated when this antenna wiring is energized occurs across the entire antenna wiring in the extension direction of the antenna wiring. As a result, the magnetic field disperses and this makes it difficult to obtain sufficiently high antenna performance.

One aspect of the present disclosure has been made based on the circumstances described above, and an object of the present disclosure is to achieve sufficiently high antenna performance.

(1) An embodiment of the present disclosure is a position detecting device including an antenna function including a plurality of first position detection electrodes extending in a first direction and separated by spaces, a plurality of second position detection electrodes extending in a second direction orthogonal to the first direction and disposed overlapping the plurality of first position detection electrodes, the plurality of second position detection electrodes being separated by spaces, a position detection circuit configured to detect a position by energizing the plurality of first position detection electrodes and the plurality of second position detection electrodes and using electric fields generated between the plurality of first position detection electrodes and the plurality of second position detection electrodes, a plurality of first antenna electrodes extending in the first direction and disposed adjacent to the plurality of first position detection electrodes, the plurality of first antenna electrodes being separated by first spaces, a plurality of second antenna electrodes extending in the second direction and disposed adjacent to the plurality of second position detection electrodes, the plurality of second antenna electrodes being separated by second spaces that at least partially overlap the first spaces, and an antenna circuit configured to perform wireless communication by energizing the plurality of first antenna electrodes and the plurality of second antenna electrodes and using magnetic fields generated in the first spaces and the second spaces.

(2) One embodiment of the present disclosure is a position detecting device including an antenna function having the configuration according to (1), further including a first conductive film constituting the plurality of first position detection electrodes and the plurality of first antenna electrodes, and a second conductive film constituting the plurality of second position detection electrodes and the plurality of second antenna electrodes.

(3) One embodiment of the present disclosure is a position detecting device including an antenna function having the configuration according to (2), further including a first dummy electrode formed of the first conductive film, the first dummy electrode extending in the first direction and disposed at a position adjacent to the plurality of first position detection electrodes and where the plurality of first antenna electrodes are not disposed, and a second dummy electrode formed of the second conductive film, the second dummy electrode extending in the second direction and disposed at a position adjacent to the plurality of second position detection electrodes and where the plurality of second antenna electrodes are not disposed.

(4) One embodiment of the present disclosure is a position detecting device including an antenna function having the configuration according to (3), further including a first ground connection portion connected to the first dummy electrode and configured to supply ground potential to the first dummy electrode, and a second ground connection portion connected to the second dummy electrode and configured to supply ground potential to the second dummy electrode.

(5) One embodiment of the present disclosure is a position detecting device including an antenna function having the configuration according to any one of (2) to (4), in which both the first conductive film and the second conductive film are formed of a metal film having a mesh shape.

(6) One embodiment of the present disclosure is a position detecting device including an antenna function having the configuration according to any one of (1) to (5), in which the antenna circuit includes a plurality of first external connection wiring lines configured to connect two first antenna electrodes included in the plurality of first antenna electrodes to an external antenna drive unit, a plurality of second external connection wiring lines configured to connect two second antenna electrodes included in the plurality of second antenna electrodes to the external antenna drive unit, a plurality of first short-circuit wiring lines configured to short-circuit two first antenna electrodes included in the plurality of first antenna electrodes and separated by the first space, and a plurality of second short-circuit wiring lines configured to short-circuit two second antenna electrodes included in the plurality of second antenna electrodes and separated by the second space, when the number of the plurality of first antenna electrodes is $2n$, two first external connection wiring lines and (n−1) first short-circuit wiring lines are connectable to one end side of each of the plurality of first antenna electrodes and a first short-circuit wiring lines are connectable to another end side of each of the plurality of first antenna electrodes, and when the number of the plurality of second antenna electrodes is $2n$, two second external connection wiring lines and (n−1) second short-circuit wiring lines are connectable to one end side of each of the plurality of second antenna electrodes and n second short-circuit wiring lines are connectable to another end side of each of the plurality of second antenna electrodes.

(7) One embodiment of the present disclosure is a position detecting device including an antenna function having the configuration according to any one of (1) to (6), in which the plurality of first antenna electrodes are arranged such that the plurality of first position detection electrodes are present in the first spaces, and the plurality of second antenna electrodes are arranged such that the plurality of second position detection electrodes are present in the second spaces.

(8) One embodiment of the present disclosure is a position detecting device including an antenna function having the configuration according to any one of (1) to (7), further including a plurality of first electrodes extending in the first direction and disposed adjacent to each of the plurality of first position detection electrodes, a portion of the plurality of first electrodes constituting the plurality of first antenna electrodes, a plurality of second electrodes extending in the second direction and disposed adjacent to each of the plurality of second position detection electrodes, a portion of the plurality of second electrodes constituting the plurality of second antenna electrodes, a first substrate provided with at least the plurality of first position detection electrodes and the plurality of first electrodes, a second substrate provided with at least the plurality of second position detection electrodes and the plurality of second electrodes, a third substrate including the antenna circuit and mounted to the first substrate, the antenna circuit being selectively connected to a particular first electrode of the plurality of first electrodes, and a fourth substrate including the antenna circuit and mounted to the second substrate, the antenna circuit being selectively connected to a particular second electrode of the plurality of second electrodes.

(9) One embodiment of the present disclosure is a position detecting device including an antenna function having the configuration according to (8), in which the third substrate is provided with a first ground connection portion connected to a first electrode of the plurality of first electrodes that is not connected to the antenna circuit, the first ground connection portion being configured to supply ground potential, and the fourth substrate is provided with a second ground connection portion connected to a second electrode of the plurality of second electrodes that is not connected to the antenna circuit, the second ground connection portion being configured to supply ground potential.

(10) One embodiment of the present disclosure is a position detecting device including an antenna function having the configuration according to any one of (1) to (7), further including a plurality of first electrodes extending in the first direction and disposed adjacent to each of the plurality of first position detection electrodes, a portion of the plurality of first electrodes constituting the plurality of first antenna electrodes, a plurality of first electrode connection portions connected to each of the plurality of first electrodes, a plurality of second electrodes extending in the second direction and disposed adjacent to the plurality of second position detection electrodes, a portion of the plurality of second electrodes constituting the plurality of second antenna electrodes, a plurality of second electrode connection portions connected to each of the plurality of second electrodes, a plurality of first switches connected to the antenna circuit and each of the plurality of first electrode connection portions, the plurality of first switches being configured to switch connection between the plurality of first electrode connection portions and the antenna circuit, and a plurality of second switches connected to the antenna circuit and each of the plurality of second electrode connection portions, the plurality of second switches being configured to switch connection between the plurality of second electrode connection portions and the antenna circuit.

(11) One embodiment of the present disclosure is a position detecting device including an antenna function having the configuration according to (10), further including a first ground connection portion connected to the plurality of first switches and configured to supply ground potential to a first electrode connection portion of the plurality of first electrode connection portions that is not connected to the antenna circuit, and a second ground connection portion connected to the plurality of second switches and configured to supply ground potential to a second electrode connection portion of the plurality of second electrode connection portions that is not connected to the antenna circuit.

(12) One embodiment of the present disclosure is a display device including the position detecting device including an antenna function according to any one of (1) to (11), a display panel layered on the position detecting device including an antenna function, the display panel including a display region in which an image is displayable, and a non-display region surrounding the display region, in which the plurality of first position detection electrodes, the plurality of second position detection electrodes, the plurality of first antenna electrodes, and the plurality of second antenna electrodes are disposed at positions overlapping the display region.

According to the one aspect of the present disclosure, it is possible to achieve sufficiently high antenna performance.

DETAILED DESCRIPTION OF THE INVENTION

First Embodiment

A first embodiment of the present disclosure will be described with reference to FIGS. 1 to 5. The present embodiment describes an exemplary liquid crystal display device (display device) 10 having a position detection function and an antenna function (wireless communication function) in addition to an image display function. Note that an X axis, a Y axis, and a Z axis are illustrated in a part of each drawing, and each axial direction is illustrated to be the direction illustrated in each drawing.

Figure 1:
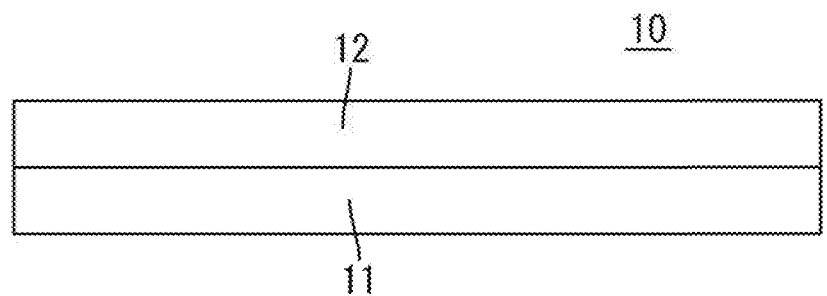
FIG. 1 is a side view of a liquid crystal display device according to a first embodiment of the present disclosure.
Figure 1:
Figure 2:
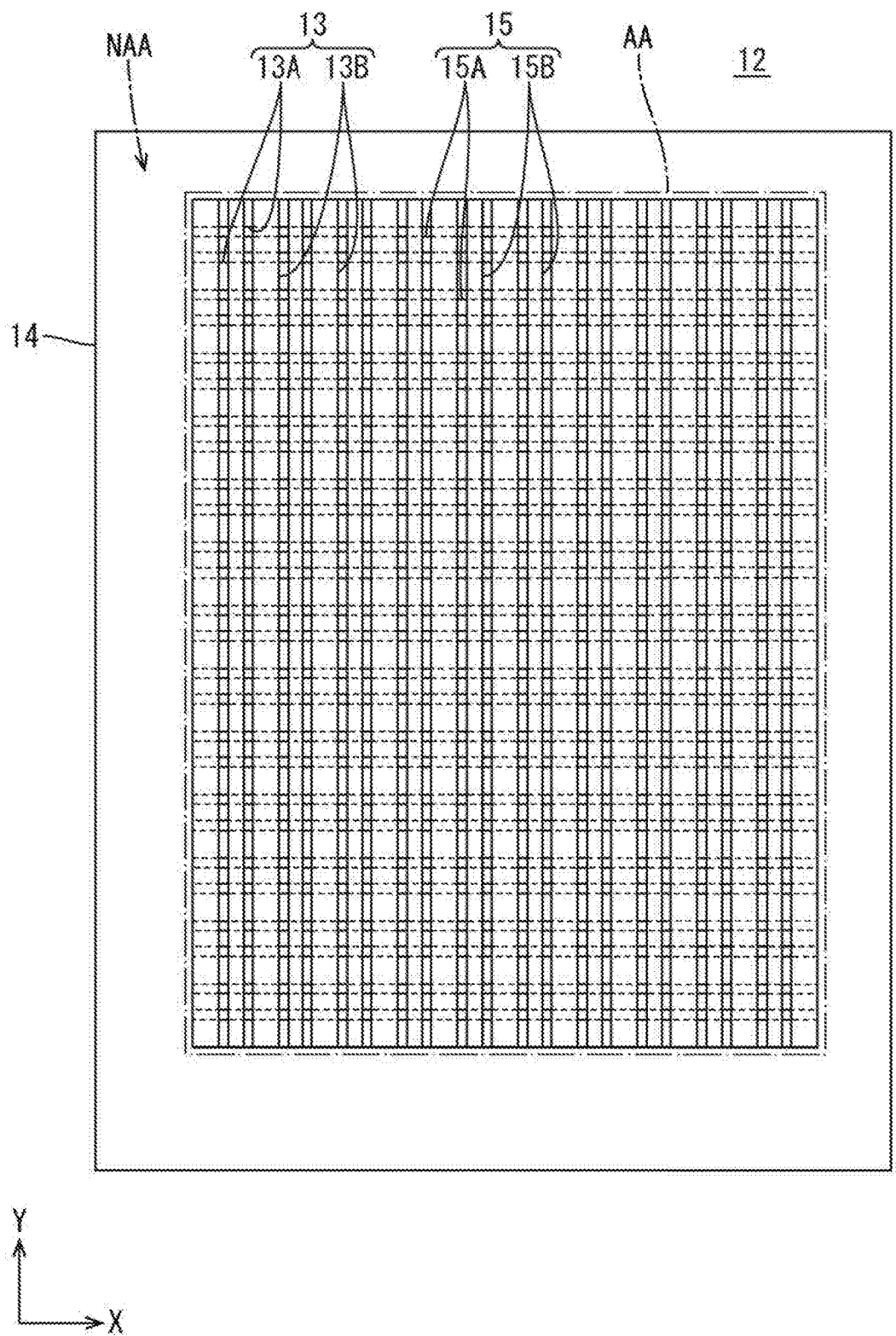
FIG. 2 is a plan view of a touch panel constituting a liquid crystal display device.

The liquid crystal display device 10 according to the present embodiment is to be used in various electronic devices such as point of sales (POS) terminals, information displays, and electronic blackboards. As illustrated in FIG. 1, the liquid crystal display device 10 includes a liquid crystal panel (display panel) 11 configured to display an image, a touch panel (position detecting device including antenna function) 12 arranged facing a front side with respect to the liquid crystal panel 11, and a backlight device (illumination device) as an external light source disposed facing a rear side with respect to the liquid crystal panel 11 and configured to irradiate light toward the liquid crystal panel 11. It is assumed that the liquid crystal panel 11 and the backlight device constituting the liquid crystal display device 10 have a display function and that the touch panel 12 has a position detection function and an antenna function. Note that the liquid crystal panel 11 and the backlight device have a known configuration. A display surface of the liquid crystal panel 11 is divided into a display region AA in which an image is displayed and a non-display region NAA in which an image is not displayed. The non-display region NAA has a frame shape that surrounds the display region AA. In FIG. 2, the display region AA is the region surrounded by a double dot chain line, and the region outside the display region AA is the non-display region NAA.

As illustrated in FIG. 2, the touch panel 12 has a generally long rectangular shape, with the short side direction coinciding with the X-axis direction in the drawings and the long side direction coinciding with the Y-axis direction in the drawings. The touch panel 12 includes at least a plurality of touch electrodes (position detection electrodes) 13 that form a touch panel pattern used for detecting the position of input by a user, and an electrode substrate 14 provided with the plurality of touch electrodes 13. The touch panel pattern according to the present embodiment is a so-called projection-type capacitive pattern and employs mutual-capacitance detection as a detection type. The plurality of touch electrodes 13 are disposed at positions overlapping the display region AA of the liquid crystal panel 11. Accordingly, a touch region (position detection region) in which an input position on the touch panel 12 can be detected is substantially identical to the display region AA of the liquid crystal panel 11, and a non-touch region (non-position detection region) in which the input position cannot be detected is substantially identical to the non-display region NAA.

Each of the plurality of touch electrodes 13 is formed from a metal film having a reticulate shape (mesh shape). The mesh metal film is formed by, for example, forming a solid metal film having light-blocking properties on the electrode substrate 14 and then etching the solid metal film to pattern a large fine mesh (mesh, openings). As a result, light transmittance of the touch panel 12 can be guaranteed to a certain extent because light passes through the mesh. As illustrated in FIG. 2, the plurality of touch electrodes 13 include first touch electrodes (first position detection electrodes) 13A that extend in the X-axis direction (first direction) and are formed as horizontal strips, and second touch electrodes (second position detection electrodes) 13B that extend in the Y-axis direction (second direction) orthogonal to the X-axis direction and are formed as vertical strips. The length dimension of each first touch electrode 13A is approximately the same as the short side dimension of the display region AA. A plurality of the first electrodes 13A are disposed side by side at approximately equal intervals in the Y-axis direction. The length dimension of each second touch electrode 13B is approximately the same as the long side dimension of the display region AA. A plurality of the second electrodes 13B are disposed side by side at approximately equal intervals in the X-axis direction. The first touch electrode 13A and the second touch electrode 13B have the same width dimension, and the intervals between first electrodes 13A and second electrodes 13B are the same. One first touch electrode 13A is arranged to overlap all of the second touch electrodes 13B in the display region AA. Similarly, one second touch electrode 13B is arranged to overlap all of the first touch electrodes 13A in the display region AA. The first touch electrode 13A constitutes a drive electrode (transmission electrode) that receives input of a touch signal (position detection signal) on the touch panel pattern. The second touch electrode 13B constitutes a detection electrode (reception electrode) on the touch panel pattern. At the detection electrode, an electric field (electrostatic capacitance) is generated between the second electrode 13B and the first touch electrode 13A, which is the drive electrode to which the touch signal has been input. With this touch panel pattern, the presence of a touch operation (position input) can be detected based on a difference in electrostatic capacitance caused by the presence of an object (such as a user's finger) that blocks the electric field formed between the first touch electrode 13A, which is the drive electrode, and the second touch electrode 13B, which is the detection electrode. Further, the input position of this touch operation can be detected.

Figure 3:
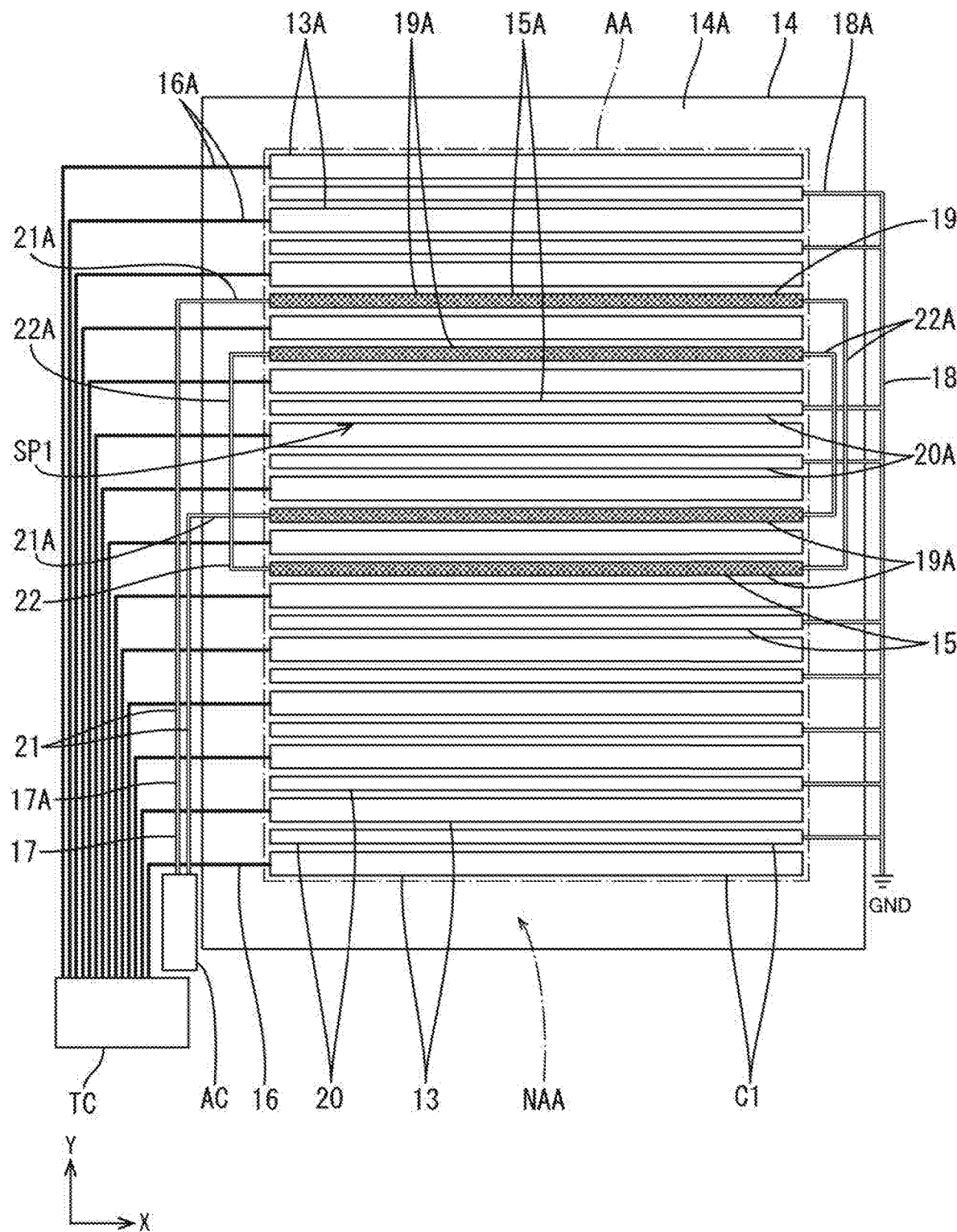
FIG. 3 is a plan view of a first electrode substrate constituting a touch panel.
Figure 4:
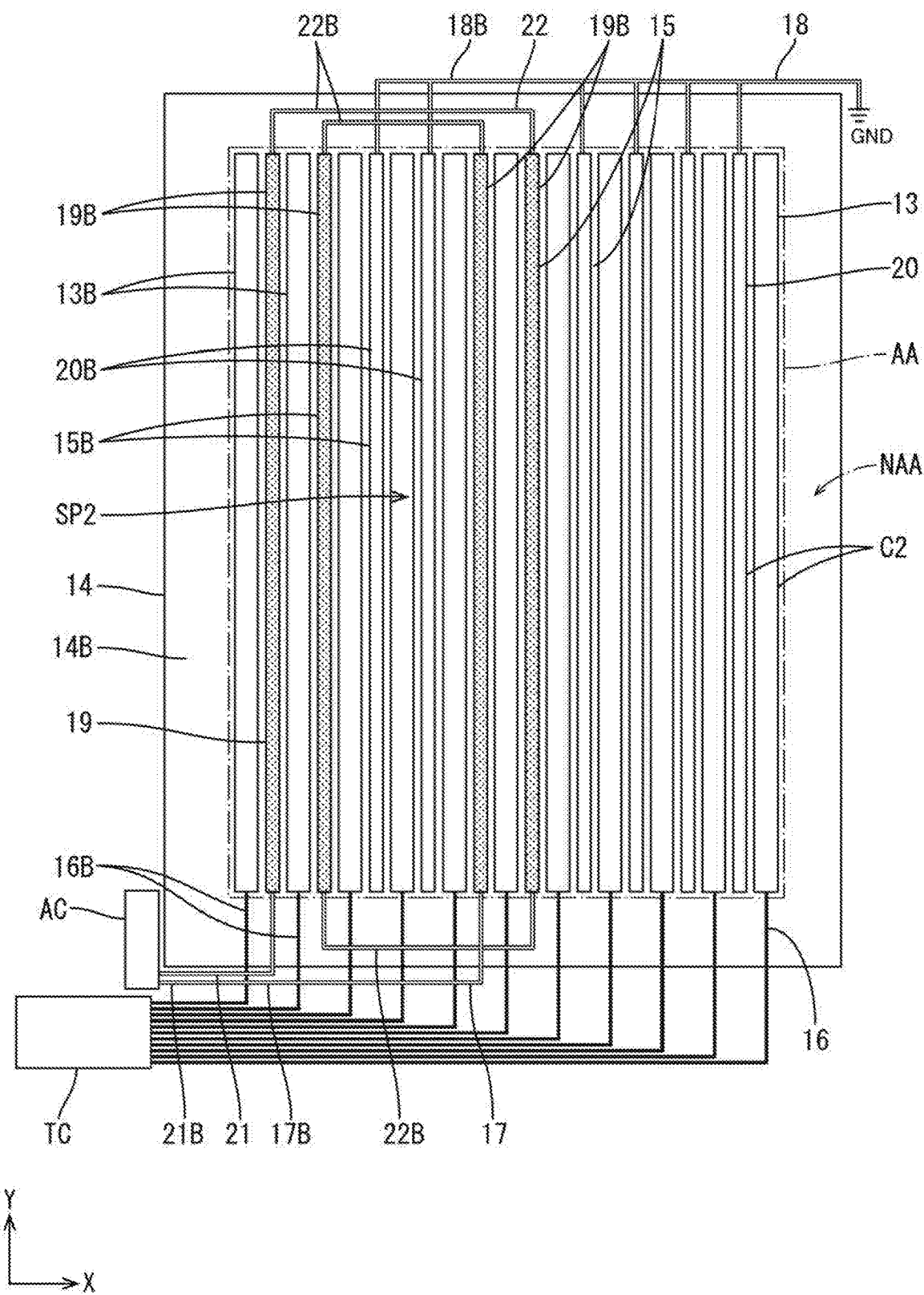
FIG. 4 is a plan view of a second electrode substrate constituting a touch panel.

The electrode substrate 14 is made of a synthetic resin material such as polyethylene terephthalate (PET), has excellent light-transmitting properties and is substantially transparent. As illustrated in FIGS. 3 and 4, the electrode substrate 14 includes a first electrode substrate (first substrate) 14A provided with the plurality of first touch electrodes 13A, and a second electrode substrate (second substrate) 14B provided with the plurality of second touch electrodes 13B. FIG. 3 is a plan view of the first electrode substrate 14A and FIG. 4 is a plan view of the second electrode substrate 14B. The planar shape and size of the first electrode substrate 14A and the second electrode substrate 14B are substantially the same as the planar shape and size of the touch panel 12. The first electrode substrate 14A is disposed overlapping a front side with respect to the second electrode substrate 14B. Thus, the first electrode substrate 14A, which is an insulator, is interposed between the first touch electrodes 13A and the second touch electrodes 13B that overlap each other) prevent short-circuiting between the touch electrodes 13A and 13B.

As illustrated in FIGS. 3 and 4, the electrode substrate 14 is provided with a plurality of electrodes 15 disposed adjacent to the plurality of touch electrodes 13. Each electrode 15 is made of the same mesh metal film as each touch electrode 13 and is disposed on the same layer as the touch electrodes 13. The electrodes 15 are arranged in a row alternating and repeating with respect to the touch electrodes 13 in the plate surface of the electrode substrate 14. Each electrode 15 is disposed between two touch electrodes 13. The number of installed electrodes 15 is one less than the number of installed touch electrodes 13. In addition, each electrode 15 has a smaller width dimension than each touch electrode 13. The plurality of electrodes 15 include a plurality of first electrodes 15A (see FIG. 3) provided on the first electrode substrate 14A and a plurality of second electrodes 15B (see FIG. 4) provided on the second electrode substrate 14B. As illustrated in FIG. 3, the first electrodes 15A extend in the X-axis direction (extension direction of the first touch electrodes 13A) and are formed as horizontal strips. The first electrodes 15A have the same length dimension as that of the first touch electrodes 13A and are arranged repeatedly at intervals from the first touch electrodes 13A along the Y-axis direction. The first electrodes 15A are made from a first conductive film C1 that is a mesh metal film formed on the plate surface of the first electrode substrate 14A together with the first touch electrodes 13A. As a result, the number of films in the first electrode substrate 14A is reduced, which is preferable. As illustrated in FIG. 4, the second electrodes 15B extend in the Y-axis direction (extension direction of the second touch electrodes 13B) and are formed as vertical strips. The second electrodes 15B have the same length dimension as that of the second touch electrodes 13B and are arranged repeatedly at intervals from the second touch electrodes 13B along the X-axis direction. The second electrodes 15B are made from a second conductive film C2 that is a mesh metal film formed on the plate surface of the second electrode substrate 14B together with the second touch electrodes 13B. As a result, the number of films in the second electrode substrate 14B is reduced, which is preferable. As illustrated in FIGS. 3 and 4, the first electrode 15A and the second electrode 15B have the same width dimension, and the intervals between first electrodes 15A and second electrodes 15B are the same. One first electrode 15A is arranged to overlap all of the second touch electrodes 13B and second electrodes 15B in the display region AA. Similarly, one second electrode 15B is arranged to overlap all of the first touch electrodes 13A and first electrodes 15A in the display region AA.

As illustrated in FIGS. 3 and 4, the electrode substrate 14 includes a position detection circuit 16 used to detect a position by energizing the plurality of touch electrodes 13, an antenna circuit 17 used to perform wireless communication by energizing some of the plurality of electrodes 15 (an antenna electrode 19 described below), and a around connection portion (ground wiring line) 18 used for supplying ground potential to some of the plurality of electrodes 15 (a dummy electrode 20 described below). The position detection circuit 16 is connected to an external touch controller (position detection drive unit) TC via an external connection member mounted on the electrode substrate 14. For example, a flexible substrate is used as the external connection member. The touch controller TC can supply pulses related to touch signals to the position detection circuit 16 via the external connection member at a low frequency of, for example, approximately 100 kHz. The position detection circuit 16 includes a first position detection circuit 16A provided on the first electrode substrate 14A and a second position detection circuit 16B provided on the second electrode substrate 14B. The antenna circuit 17 is connected to an external antenna controller (antenna drive unit, NFC controller) AC via an external connection member mounted to the electrode substrate 14. The antenna controller AC can supply pulses related to antenna signals to the antenna circuit 17 via the external connection member at a high frequency of, for example, approximately 14 MHz (13.56 MHz, etc.). The antenna circuit 17 includes a first antenna circuit 17A provided on the first electrode substrate 14A and a second antenna circuit 17B provided on the second electrode substrate 14B. The ground connection portion 18 is connected to an external ground GND via an external connection member mounted to the electrode substrate 14 and is constantly held at ground potential of the ground GND. The ground connection portion 18 includes a first ground connection portion (first ground wiring line) 18A provided on the first electrode substrate 14A and a second ground connection portion (second ground wiring line) 18B provided on the second electrode substrate 14B.

In the present embodiment, of the plurality of electrodes 15, electrodes 15 connected to the antenna circuit 17 are the antenna electrodes 19 and are configured to perform an antenna function. As illustrated in FIGS. 3 and 4, the antenna electrodes 19 include a plurality of first antenna electrodes 19A, which are first electrodes 15A of the plurality of first electrodes 15A that are connected to the first antenna circuit 17A, and a plurality of second antenna electrodes 19B, which are second electrodes 15B of the plurality of second electrodes 15B that are connected to the second antenna circuit 17B. As illustrated in FIG. 3, a plurality of the first antenna electrodes 19A are disposed separated by first spaces SP1 in the Y-axis direction. Specifically, of the plurality of first electrodes 15A, four first electrodes, namely, the third first electrode 15A, the fourth first electrode 15A, the seventh first electrode 15A, and the eighth first electrode 15A counting from the upper edge in FIG. 3 are the first antenna electrodes 19A. The first space SP1 is present between the fourth first electrode 15A and the seventh first electrode 15A counting from the upper edge in FIG. 3 and is arranged overlapping two first electrodes 15A (the fifth and sixth first electrodes 15A) and three first touch electrodes 13A (the fifth, sixth, and seventh first touch electrodes 13A). The first space SP1 has a long, horizontal belt shape and a width dimension that is slightly larger than sum of the width dimensions of two first electrodes 15A and three first touch electrodes 13A. With this configuration, the first space SP1 in which a magnetic field is generated is sufficiently ensured.

Figure 5:
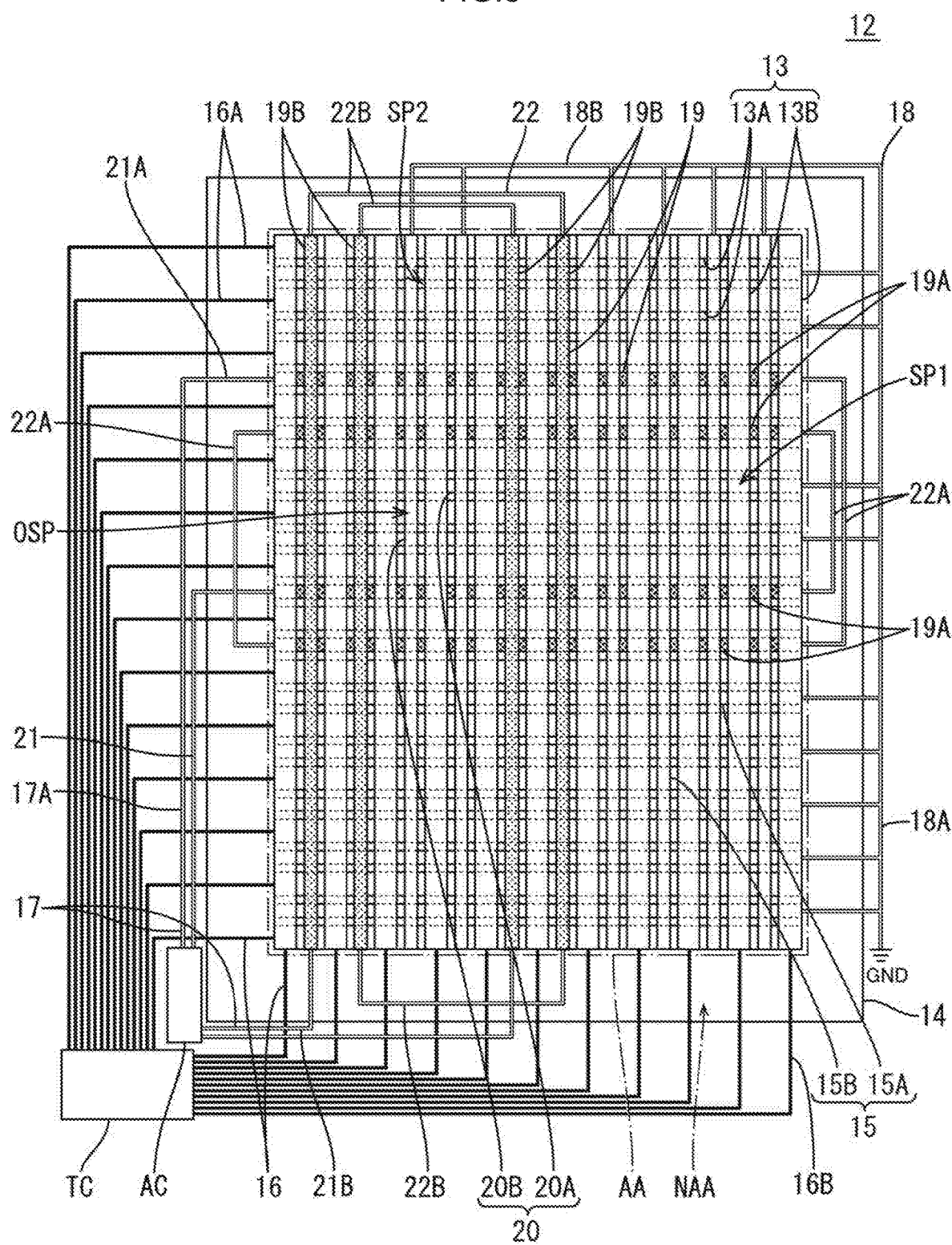
FIG. 5 is a plan view of a touch panel when an antenna circuit is in an energized state.

As illustrated in FIG. 4, a plurality of the second antenna electrodes 19B are disposed separated by second spaces SP2 in the X-axis direction. Specifically, of the plurality of second electrodes 15B, four second electrodes, namely, the first second electrode 15B, the second second electrode 15B, the fifth second electrode 15B, and the sixth second electrode 15B counting from the left edge in FIG. 4 are the second antenna electrodes 19B. The second space SP2 is present between the second second electrode 15B and the fifth second electrode 15B counting from the left edge in FIG. 4 and is arranged overlapping two second electrodes 15B (the third and fourth second electrodes 15B) and three second touch electrodes 13B (the third, fourth, and fifth second touch electrodes 13B). The second space SP2 has a long, vertical belt shape and a width dimension that is slightly larger than the sum of the width dimensions of two second electrodes 15B and three second touch electrodes 13B and is substantially the same of that of the first space SP1. With this configuration, the second space SP2 in which a magnetic field is generated is sufficiently ensured. In addition, as illustrated in FIG. 5, the first space SP1 and the second space SP2 are arranged so as to partially overlap each other. An overlapping space OSP between the first space SP1 and the second space SP2 has a substantially square shape in plan view. The dimension of one side of the overlapping space OSP is equal to the width dimension of the first space SP1 and the second space SP2.

When each of the plurality of antenna electrodes 19A, 19B is energized by the antenna circuit 17, as illustrated in FIG. 5, a magnetic field is generated in each of the spaces SP1, SP2 present between each of the plurality of antenna electrodes 19A, 19B based on pulses output from the antenna controller AC. The magnetic fields generated in the spaces SP1, SP2 can be used to perform near field wireless communication such as Near Field Communication (NFC) between an external device and the touch panel 12 according to the present embodiment. Specific examples of the external device include an IC card and a smartphone including a device-side antenna. Near field wireless communication can be achieved when a user brings an external device such as an IC card or a smartphone close to the spaces SP1, SP2 between each of the plurality of antenna electrodes 19A, 19B based on an image displayed in the display region AA of the liquid crystal panel 11. In this way, the overlapping space OSP in which the first space SP1 and the second space SP2 overlap has a limited range with respect to the X-axis direction and the Y-axis direction based on the position of the first space SP1 in the Y-axis direction and the position of the second space SP2 in the X-axis direction. Further, the magnetic field generated in the overlapping space OSP is strengthened by the interaction between the magnetic field generated in the first space SP1 and the magnetic field generated in the second space SP2. This interaction increases the strength of the magnetic field used in near field wireless communication. Further, the high strength magnetic field is generated in a limited range, which suppresses dispersion. Thus, it is possible to achieve sufficiently high antenna performance. In addition, the user can input a position based on the image displayed in the display region AA and operate the external device for near field wireless communication, Thus, the liquid crystal display device 10 has excellent convenience.

On the other hand, of the plurality of electrodes 15, electrodes 15 that are not connected to the antenna circuit 17 are dummy electrodes 20. As illustrated in FIGS. 3 and 4, the dummy electrodes 20 include a plurality of first dummy electrodes 20A, which are first electrodes 15A of the plurality of first electrodes 15A that are not connected to the first antenna circuit 17A (not the first antenna electrodes 19A), and a plurality of second dummy electrodes 20B, which are second electrodes 15B of the plurality of second electrodes 15B that are not connected to the second antenna circuit 17B (not the second antenna electrodes 19B). As illustrated in FIG. 3, the plurality of first dummy electrodes 20A are disposed at positions adjacent to the first touch electrodes 13A and where the first antenna electrodes 19A are not disposed. Specifically, of the plurality of first electrodes 15A, nine first electrodes 15A, that is, the first first electrode 15A, the second first electrode 15A, the fifth first electrode 15A, the sixth first electrode 15A, the ninth first electrode 15A, the tenth first electrode 15A, the eleventh first electrode 15A, the twelfth first electrode 15A, and the thirteenth first electrode 15A counting from the upper edge in FIG. 3 are the first dummy electrodes 20A. These first dummy electrodes 20A include electrodes (the fifth and sixth first electrodes 15A) that are disposed overlapping the first spaces SP1.

As illustrated in FIG. 4, the second dummy electrodes 20B are disposed at positions adjacent to the second touch electrodes 13B and where the second antenna electrodes 19B are not disposed. Specifically, of the plurality of second electrodes 15B, six second electrodes 15B, that is, the third second electrode 15B, the fourth second electrode 15B, the seventh second electrode 15B, the eighth second electrode 15B, the ninth second electrode 15B, and the tenth second electrode 15B counting from the left edge in FIG. 4 are the second dummy electrodes 20B. These second dummy electrodes 20B include electrodes (the third and fourth second electrodes 15B) that are disposed overlapping the second space SP2s. As described above, of the positions adjacent to each of the first touch electrodes 13A and second touch electrodes 13B, each first dummy electrode 20A and second dummy electrode 20B is disposed at a position where the first antenna electrode 19A and the second antenna electrode 19B are not disposed. Thus, conditions such as light transmittance are the same at positions at which the first antenna electrode 19A and the second antenna electrode 19B are disposed. As a result, display unevenness is less visible in an image displayed in the display region AA of the liquid crystal panel 11.

As illustrated in FIGS. 3 and 4, the dummy electrodes 20 are connected to the ground connection portion 18. The ground connection portion 18 includes the first ground connection portion 18A connected to the plurality of first dummy electrodes 20A and the second ground connection portion 18B connected to the plurality of second dummy electrodes 20B. As illustrated in FIG. 3, the first ground connection portion 18A is always maintained at ground potential by being connected to the external ground GND such that ground potential can be supplied to the plurality of connected first dummy electrodes 20A. As illustrated in FIG. 4, the second ground connection portion 18B is always maintained at ground potential by being connected to the external ground GND such that ground potential can be supplied to the plurality of connected second dummy electrodes 20B. As a result, potential fluctuations are unlikely to occur in the plurality of first dummy electrodes 20A and second dummy electrodes 20B. Thus, it is possible to prevent the first dummy electrodes 20A and the second dummy electrodes 20B from floating and becoming a source of noise. With this configuration, the position detection performance of the position detection circuit 16 is less likely to deteriorate.

The antenna circuit 17 will now be described in detail. As illustrated in FIGS. 3 and 4, the antenna circuit 17 includes two external connection wiring lines 21 that connect two antenna electrodes 19 of the plurality of antenna electrodes 19 to the external antenna controller AC, and three short-circuit wiring lines 22 configured to short-circuit two antenna electrodes 19 of the plurality of antenna electrodes 19. The two external connection wiring lines 21 are disposed on the same side with respect to the two antenna electrodes 19 to be connected. In contrast, the three short-circuit wiring lines 22 are disposed in a dispersed manner on one end sides and other end sides of three pairs of two antenna electrodes 19 that are to be connected. Of the three short-circuit wiring lines 22, one short-circuit wiring line 22 is disposed on the same side of the antenna electrode 19 as the two external connection wiring lines 21, and two short-circuit wiring lines 22 are disposed on a side of the antenna electrode 19 opposite to the two external connection wiring lines 21. The external connection wiring lines 21 include a first external connection wiring line 21A that is provided on the first electrode substrate 14A and connects the first antenna electrodes 19A to the external antenna controller AC, and a second external connection wiring line 21B that is provided on the second electrode substrate 14B and connects the second antenna electrodes 19B to the external antenna controller AC. The short-circuit wiring lines 22 include a first short-circuit wiring line 22A that short-circuits two first antenna electrodes 19A provided on the first electrode substrate 14A and separated by the first space SP1, and a second short-circuit wiring line 22B that short-circuits two second antenna electrodes 19B provided on the second electrode substrate 14B and separated by the second space SP2.

Specifically, as illustrated in FIG. 3, two first external connection wiring lines 21A are connected to left side end portions (one end sides) in FIG. 3 of the first antenna electrodes 19A to be connected. Three first short-circuit wiring lines 22A include one first short-circuit wiring line 22A connected to left side end portions in FIG. 3 of the two first antenna electrodes 19A to be connected, and two first short-circuit wiring lines 22A connected to right side end portions (other end sides) in FIG. 3 of the two first antenna electrodes 19A to be connected. Two first external connection wiring lines 21A include one first external connection wiring line 21A connected to the first antenna electrode 19A that is the third first electrode 15A counting from the upper edge in FIG. 3 among the plurality of first electrodes 15A, and one first external connection wiring line 21A connected to the first antenna electrode 19A that is the seventh first electrode 15A counting from the upper edge in FIG. 3 among the plurality of first electrodes 15A. Of the three first short-circuit wiring lines 22A, the first short-circuit wiring line 22A disposed on the same side (left side in FIG. 3) as the first external connection wiring lines 21A in the X-axis direction is connected to the first antenna electrode 19A that is the fourth first electrode 15A counting from the top edge in FIG. 3 and the first antenna electrode 19A that is the eighth first electrode 15A counting from the top edge in FIG. 3. Of the three first short-circuit wiring lines 22A, the two first short-circuit wiring lines 22A disposed on a side (right side in FIG. 3) opposite to the first external connection wiring lines 21A in the X-axis direction include a first short-circuit wiring line 22A connected to the first antenna electrode 19A that is the third first electrode 15A counting from the upper edge in FIG. 3 and is connected to the first external connection wiring line 21A, and the first antenna electrode 19A that is the eighth first electrode 15A counting from the upper edge in FIG. 3, and a first short-circuit wiring line 22A connected to the first antenna electrode 19A that is the fourth first electrode 15A counting from the upper edge in FIG. 3, and the first antenna electrode 19A that is the seventh first electrode 15A counting from the upper edge in FIG. 3 and is connected to the first external connection wiring line 21A. When the first antenna circuit 17A having the configuration described above is energized, spiral current flows through the four first antenna electrodes 19A and magnetic fields are generated in the first spaces SP1.

As illustrated in FIG. 4, the two second external connection wiring lines 21B are connected to lower side end portions (one end sides) in FIG. 4 of the second antenna electrodes 19B to be connected. Three second short-circuit wiring lines 22B include one second short-circuit wiring line 22B connected to lower side end portions in FIG. 4 of the two second antenna electrodes 19B to be connected, and two second short-circuit wiring lines 22B connected to upper side end portions (other end sides) in FIG. 4 of the two second antenna electrodes 19B to be connected. Two second external connection wiring lines 21B include a second external connection wiring line 21B connected to the second antenna electrode 19B that is the first second electrode 15B counting from the left edge in FIG. 4 among the plurality of second electrodes 15B, and a second external connection wiring line 21B connected to the second antenna electrode 19B that is the fifth second electrode 15B counting from the left edge in FIG. 4 among the plurality of second electrodes 15B. Of the three second short-circuit wiring lines 22B, the second short-circuit wiring line 22B disposed on the same side (lower side in FIG. 4) as the second external connection wiring lines 21B in the Y-axis direction are connected to the second antenna electrode 19B that is the second second electrode 15B counting from the left edge in FIG. 4 and the second antenna electrode 19B that is the sixth second electrode 15B counting from the left edge in FIG. 4. Of the three second short-circuit wiring lines 22B, two second short-circuit wiring lines 22B disposed on a side (upper side in FIG. 4) opposite to the second external connection wiring lines 21B in the Y-axis direction include a second short-circuit wiring line 22B connected to the second antenna electrode 19B that is the first second electrode 15B counting from the left edge in FIG. 4 and is connected to the second external connection wiring line 21B, and the second antenna electrode 19B that is the sixth second electrode 15B counting from the left edge in FIG. 4, and a second short-circuit wiring line 22B connected to the second antenna electrode 19B that is the second second electrode 15B counting from the left edge in FIG. 4 and a second antenna electrode 19B that is the fifth second electrode 15B counting from the left edge in FIG. 4 and is connected to the second external connection wiring line 21B. When the second antenna circuit 17B having the configuration described above is energized, spiral current flows through the four second antenna electrodes 19B and magnetic fields are generated in the second spaces SP2.

The present embodiment has the structure described above, and the actions thereof will now be described. With the liquid crystal display device 10 according to the present embodiment, the input position of a touch operation performed by a user on the touch panel 12 can be detected while an image is displayed in the display region AA of the liquid crystal panel 11, and near field wireless communication can be performed with an external device that the user has moved close to the touch panel 12. In order to achieve such a position detection function and an antenna function, the touch panel 12 is supplied with pulses from the external touch controller TC and the antenna controller AC.

Regarding the position detection function, as illustrated in FIG. 5, pulses (touch signals) output from the touch controller TC are supplied to each touch electrode 13 via the position detection circuit 16. At this time, an electric field is generated between each of the first touch electrodes 13A serving as a drive electrode in the touch panel pattern and each of the second touch electrodes 139 serving as a detection electrode in the touch panel pattern. A difference in capacitance occurs between the first touch electrode 13A and the second touch electrode 13B depending on whether the electric field is blocked by a user's finger or another object. This difference in capacitance makes it possible to detect the presence or absence of a touch operation and the input position of the touch operation.

Regarding the antenna operation, as illustrated in FIG. 5, pulses (antenna signals) output from the antenna controller AC are supplied to each antenna electrode 19 via the antenna circuit 17. Specifically, on the first electrode substrate 14A, the pulses output from the antenna controller AC are supplied to the four first antenna electrodes 19A and the three first short-circuit wiring lines 22A via the first external connection wiring lines 21A. At this time, the pulses have a spiral transmission path which causes magnetic fields to be generated in the first spaces SP1 present between the four first antenna electrodes 19A. In addition, on the second electrode substrate 14B, the pulses output from the antenna controller AC are supplied to the four second antenna electrodes 19B and the three second short-circuit wiring lines 22B via the second external connection wiring lines 21B. At this time, the pulses have a spiral transmission path which causes magnetic fields to be generated in the second spaces SP2 present between the four second antenna electrodes 19B. Then, if the pulses output from the antenna controller AC to the first antenna circuit 17A and the second antenna circuit 17B are synchronized such that the magnetic fields generated in the first spaces SP1 and the second spaces SP2 have the same orientation, the magnetic fields generated in the first spaces SP1 and the second spaces SP2 exhibit a strong interaction in the overlapping space OSP. As a result, a stronger magnetic field is venerated in the overlapping space OSP than in a non-overlapping space, and this strong magnetic field can be used to stably perform near field wireless communication with an external device. Thus, excellent antenna performance can be obtained. Note that in FIG. 5, the antenna electrodes 19 of the plurality of electrodes 15 are illustrated as shaded.

As described above, the touch panel (position detecting device including an antenna function) 12 according to the present embodiment includes a plurality of first touch electrodes (first position detection electrodes) 13A extending in a first direction and separated by spaces, a plurality of second touch electrodes (second position detection electrodes) 13B extending in a second direction orthogonal to the first direction and disposed overlapping the plurality of first touch electrodes 13A, the plurality of second touch electrodes 13B separated by spaces, a position detection circuit 16 configured to detect a position by energizing the plurality of first touch electrodes 13A and the plurality of second touch electrodes 13B and using electric fields generated between the plurality of first touch electrodes 13A and the plurality of second touch electrodes 13B, a plurality of first antenna electrodes 19A extending in the first direction and disposed adjacent to the plurality of first touch electrodes 13A, the plurality of first antenna electrodes separated by first spaces SP1, a plurality of second antenna electrodes 19B extending in the second direction and disposed adjacent to the plurality of second touch electrodes 13B, the plurality of second antenna electrodes 19B separated by second spaces SP2 that at least partially overlap the first spaces SP1, and an antenna circuit 17 configured to perform wireless communication by energizing the plurality of first antenna electrodes 19A and the plurality of second antenna electrodes 19B and using magnetic fields generated in the first spaces SP1 and the second spaces SP2.

According to such a configuration, when the plurality of first touch electrodes 13A and second touch electrodes 13B are energized by the position detection circuit 16, electric fields are generated between each of the first touch electrodes 13A and second touch electrodes 13B, and those electric fields are used to detect a position. On the other hand, when the plurality of first antenna electrodes 19A and second antenna electrodes 19B are energized by the antenna circuit 17, magnetic fields are generated in the first spaces SP1 present between the plurality of first antenna electrodes 19A extending in the first direction and the second spaces SP2 present between the plurality of second antenna electrodes 19B extending in the second direction, and those magnetic fields are used to perform wireless communication. The overlapping space in which the first space SP1 and the second space SP2 overlap is present within a limited range in both the first direction and the second direction based on the position of the first space SP1 in the second direction and the position of the second space SP2 in the first direction. Further, the magnetic field generated in the overlapping space is strengthened by the interaction between the magnetic field generated in the first space SP1 and the magnetic field generated in the second space SP2. Accordingly, the strength of the magnetic field used for wireless communication is enhanced by the interaction, and the generation range of this high strength magnetic field is limited. As a result, dispersion is suppressed and sufficiently high antenna performance can be achieved.

In addition, the touch panel further includes a first conductive film C1 constituting the plurality of first touch electrodes 13A and the plurality of first antenna electrodes 19A, and a second conductive film C2 constituting the plurality of second touch electrodes 13B and the plurality of second antenna electrodes 19B. With this configuration, the first touch electrodes 13A and the first antenna electrodes 19A are constituted by the same first conductive film C1, and the second touch electrodes 13B and the second antenna electrodes 19B are constituted by the same second conductive film C2, and this is preferable in terms of reducing the number of films.

In addition, the touch panel further includes a first dummy electrode 20A formed of the first conductive film C1, the first dummy electrode 20A extending in the first direction and disposed at a position adjacent to the plurality of first touch electrodes 13A and where the plurality of first antenna electrodes 19A are not disposed, and a second dummy electrode 20B formed of the second conductive film C2, the second dummy electrode 20B extending in the second direction and disposed at a position adjacent to the plurality of second touch electrodes 13B and where the plurality of second antenna electrodes 19B are not disposed. The first antenna electrodes 19A and the second antenna electrodes 19B may or may not be disposed at positions adjacent to the plurality of first touch electrodes 13A and positions adjacent to the plurality of second touch electrodes 13B, respectively. The first dummy electrode 20A made from the same first conductive film C1 as the first antenna electrode 19A and the second dummy electrode 20B made from the same second conductive film C2 as the second antenna electrode 19B are disposed at positions where the first antenna electrodes 19A and the second antenna electrodes 19B are not disposed. Thus, conditions such as light transmittance are the same at the positions where the first antenna electrodes 19A and the second antenna electrodes 19B are disposed.

In addition, the touch panel further includes a first ground connection portion 18A connected to the first dummy electrode 20A and configured to supply ground potential to the first dummy electrode 20A, and a second ground connection portion 18B connected to the second dummy electrode 20B and configured to supply ground potential to the second dummy electrode 20B. With this configuration, potential fluctuation is less likely to occur at the first dummy electrodes 20A connected to the first ground connection portion 18A and the second dummy electrodes 20B connected to the second ground connection portion 18B because these electrodes are supplied with ground potential. Thus, the first dummy electrodes 20A and the second dummy electrodes 20B can be prevented from floating and becoming a source of noise. As a result, the position detection performance of the position detection circuit 16 is less likely to deteriorate.

In addition, both the first conductive film C1 and the second conductive film C2 are formed of a mesh metal film. This configuration is preferable in that the transmission of light through the mesh of the metal film makes it possible to ensure optical transparency of the first antenna electrodes 19A and the second antenna electrodes 19B, and excellent electrical conductivity can be obtained to improve antenna performance.

In addition, the antenna circuit 17 includes a plurality of first external connection wiring lines 21A configured to connect two first antenna electrodes 19A included in the plurality of first antenna electrodes 19A to an external antenna controller (antenna drive unit) AC, a plurality of second external connection wiring lines 21B configured to connect two second antenna electrodes 19B included in the plurality of second antenna electrodes 19B to the antenna controller AC, a plurality of first short-circuit wiring lines 22A configured to short-circuit two first antenna electrodes 19A included in the plurality of first antenna electrodes 19A and separated by the first space SP1, and a plurality of second short-circuit wiring lines 22B configured to short-circuit two second antenna electrodes 19B included in the plurality of second antenna electrodes 19B and separated by the second space SP2, when the number of the plurality of first antenna electrodes 19A is 2n, two first external connection wiring lines 21A and (n−1) first short-circuit wiring lines 22A are connectable to one end side of each of the plurality of first antenna electrodes 19A, and n first short-circuit wiring lines 22A are connectable to another end side of each of the plurality of first antenna electrodes 19A, and when the number of the plurality of second antenna electrodes 19B is 2n, two second external connection wiring lines 19B and (n−1) second short-circuit wiring lines 22B are connectable to one end side of each of the plurality of second antenna electrodes 19B, and n second short-circuit wiring lines 22B are connectable to another end side of each of the plurality of second antenna electrodes 19B. With this configuration the two first antenna electrodes 19A are connected to the external antenna controller AC by the first external connection wiring lines 21A constituting the antenna circuit 17, and the two second antenna electrodes 19B are connected to the antenna controller AC by the second external connection wiring lines 21B. Further, the two first antenna electrodes 19A separated by the first spaces SP1 are short-circuited by the first short-circuit wiring lines 22A constituting the antenna circuit 17, and the two second antenna electrodes 19B separated by the second spaces SP2 are short-circuited by the second short-circuit wiring lines 22B. Specifically, in each of 2n, that is, an even number of first antenna electrodes 19A, two first external connection wiring lines 21A and (n−1) first short-circuit wiring lines 22A can be connected to one end sides and n first short-circuit wiring lines 22A can be connected to other end sides. Similarly, in each of 2n, that is, an even number of second antenna electrodes 19B, two second external connection wiring lines 21B and (n−1) second short-circuit wiring lines 22B can be connected to one end sides and n second short-circuit wiring lines 22B can be connected to other end sides. Accordingly, when the antenna circuit 17 and each of the plurality of first antenna electrodes 19A and second antenna electrodes 19B are energized by the external antenna controller AC, magnetic; fields are generated in the first spaces SP1 between the plurality of first antenna electrodes 19A and the second spaces SP2 between the plurality of second antenna electrodes 19B. Further, because the two first external connection wiring lines 21A are arranged in an aggregated manner on the same one end side with respect to the first antenna electrodes 19A, it is possible to avoid a case where the two first external connection wiring lines 21A are distributed on one end side and the other end side of the first antenna electrode 19A, as in the case where the number of first antenna electrodes 19A is an odd number. Further, because the two second external connection wiring lines 21B are arranged in an aggregated manner on the same one end side with respect to the second antenna electrodes 19B, it is possible to avoid a case where the two second external connection wiring lines 21B are distributed on one end side and the other end side of the second antenna electrode 19B, as in the case where the number of second antenna electrodes 19B is an odd number. Note that n is a natural number.

In addition, the plurality of first antenna electrodes 19A are arranged such that the plurality of first touch electrodes 13A are present in the first spaces SP1, and the plurality of second antenna electrodes 19B are arranged such that the plurality of second touch electrodes 13B are present in the second spaces SP2. Compared to a case where a position detection electrode is not present in the first space SP1 between the plurality of first antenna electrodes 19A and the second space SP2 between the plurality of second antenna electrodes 19B, the first space SP1 and the second space SP2 widen to the same size as the position detection electrode. As a result, sufficient first spaces SP1 and second spaces SP2 where magnetic fields occur can be ensured.

In addition, a liquid crystal display device (display device) 10 according to the present embodiment includes the above-described touch panel 12, the liquid crystal panel (display panel) 11 layered on the touch panel 12, the liquid crystal panel 11 including a display region AA in which an image is displayable, and a non-display region NAA surrounding the display region AA, in which the plurality of first touch electrodes 13A, the plurality of second touch electrodes 13B, the plurality of first antenna electrodes 19A, and the plurality of second antenna electrodes 19B are disposed at positions overlapping the display region AA. With a liquid crystal display device 10 having such a configuration, each of the plurality of touch electrodes 13A, 13B arranged at positions overlapping the display region AA of the liquid crystal panel 11 are energized by the position detection circuit 16 to achieve the position detection function, and each of the plurality of antenna electrodes 19A, 19B arranged at positions overlapping the display region AA of the liquid crystal panel 11 are energized by the antenna circuit 17 to achieve the antenna function. The user can input a position based on the image displayed in the display region AA and operate the external device for wireless communication. Thus, the liquid crystal display device 10 has excellent convenience.

Second Embodiment

A second embodiment of the present disclosure will be described with reference to FIGS. 6 to 11. The second embodiment will be described, Note that redundant descriptions of structures, actions, and effects similar to those of the first embodiment described above will be omitted.

Figure 6:
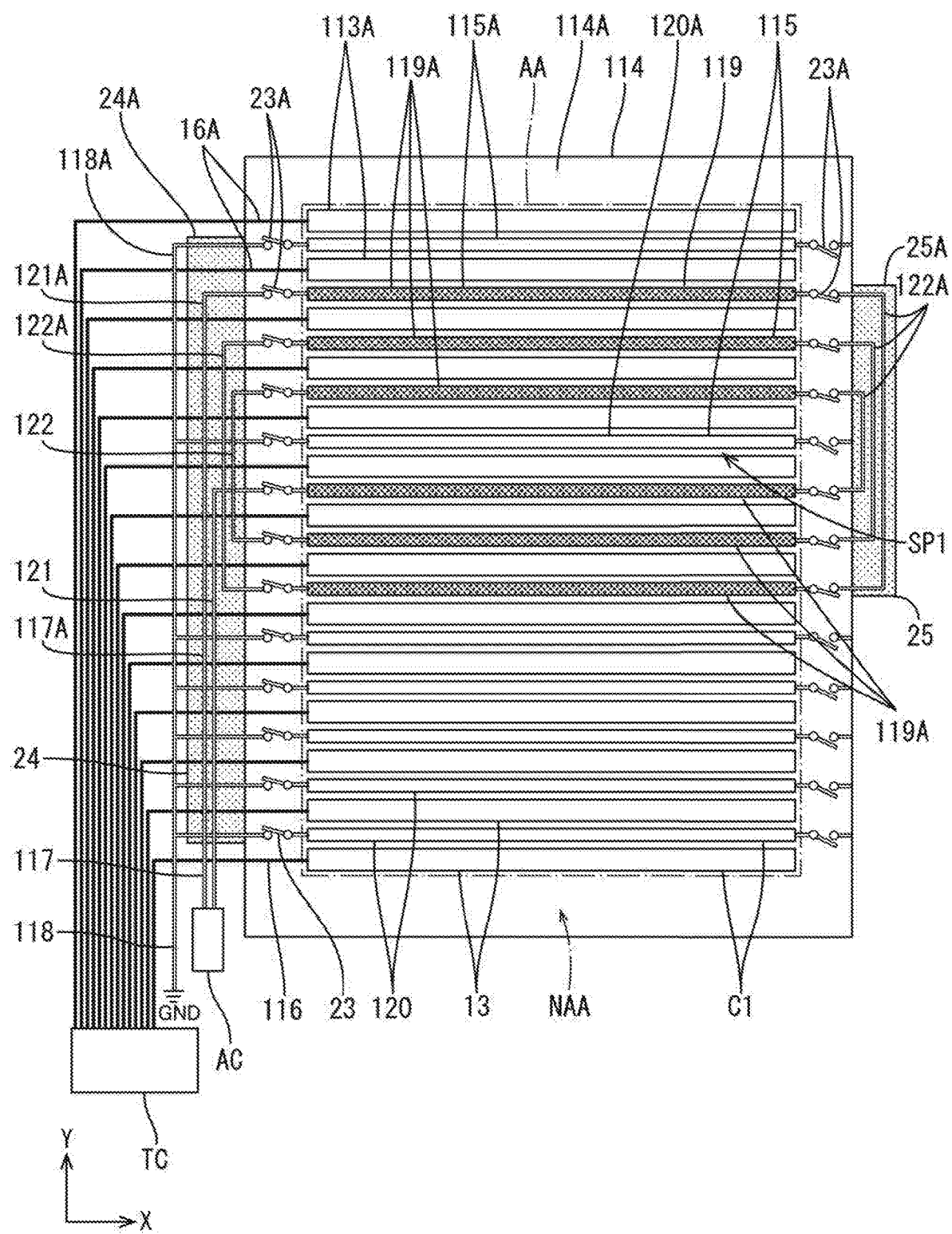
FIG. 6 is a plan view of a first electrode substrate constituting a touch panel according to a second embodiment of the present disclosure.
Figure 7:
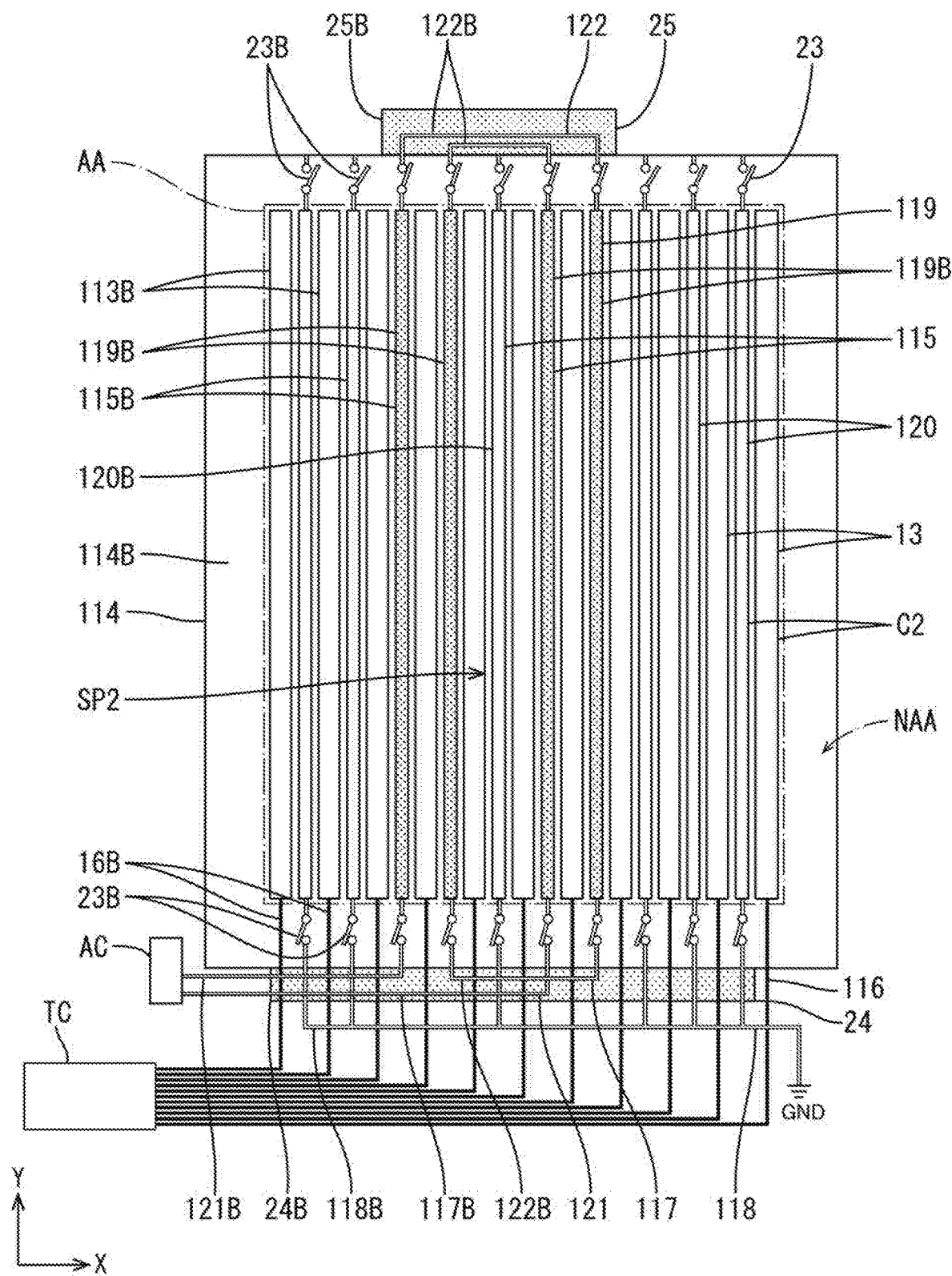
FIG. 7 is a plan view of a second electrode substrate constituting a touch panel.

As illustrated in FIGS. 6 and 7, an electrode substrate 114 according to the present embodiment is provided with a plurality of electrode switches 23 in a manner where the electrode switches 23 are individually connected to all of a plurality of electrode switches 115. The number of electrode switches 23 installed on the electrode substrate 114 is twice the number of installed electrodes 115. The electrode switches 23 are disposed in pairs on the electrode substrate 114 at positions sandwiching an electrode 115 from both sides in the extension direction of the electrode 115 and are each connected to one end side and the other end side of the electrode 115. The plurality of electrode switches 23 include a plurality of first electrode switches 23A provided on a first electrode substrate 114A and a plurality of second electrode switches 23B provided on a second electrode substrate 114B. As illustrated in FIG. 6, the first electrode switch 23A is connected to the left side end portion and the right side end portion illustrated in FIG. 6 of the first electrode 115A on the first electrode substrate 114A. In contrast, as illustrated in FIG. 7, the second electrode switch 23B is connected to the lower side end portion and the upper side end portion illustrated in FIG. 7 of the second electrode 115B on the second electrode substrate 114B. Note that the electrode switch 23 may be either a mechanical switch or an electronic switch provided that the electrode switch 23 can transmit the pulses provided to the antenna circuit 17. The electrode switch 23 is connected to a switch controller such that the switching state of the electrode switch 23 is mechanically or electronically controlled by the switch controller.

Further, as illustrated in FIGS. 6 and 7, a touch panel 112 according to the present embodiment includes an external connection flexible substrate 24 including external connection wiring lines 121 and short-circuit wiring lines 122 constituting an antenna circuit 117, and a short-circuit flexible substrate 25 including the short-circuit wiring lines 122 and not the external connection wiring lines 121. The external connection flexible substrate 24 and the short-circuit flexible substrate 25 are each mounted to different sides of a pair of sides that sandwich the electrode substrate 114 in the extension direction of the electrode 115. Note that in FIGS. 6 to 11, the external connection flexible substrate 24 and the short-circuit flexible substrate 25 are illustrated as shaded. Specifically, the external connection flexible substrate 24 is provided with an external connection wiring line 121 connected to an antenna electrode 119 via the electrode switch 23, a short-circuit wiring line 122 connected to the antenna electrode 119 via the electrode switch 23, and a ground connection portion 118 connected to the dummy electrode 120 via the electrode switch 23. The length dimension of the external connection flexible substrate 24 is the same as the length dimension of the side of the electrode substrate 114 on which the external connection flexible substrate 24 is mounted. Thus, the mounting position of the external connection flexible substrate 24 on the electrode substrate 114 is fixed. The short-circuit flexible substrate 25 is mounted to a side of the electrode substrate 114 opposite to the side on which the external connection flexible substrate 24 is mounted. The short-circuit wiring line 122 connected to the antenna electrode 119 via the electrode switch 23 is provided on the short-circuit flexible substrate 25. The short-circuit flexible substrate 25 has a length dimension that is smaller than a length dimension of the side of the electrode substrate 114 on which the short-circuit flexible substrate 25 is mounted.

As illustrated in FIGS. 6 and 7, the external connection flexible substrate 24 includes a first external connection flexible substrate (third substrate) 24A mounted to the first electrode substrate 114A and a second external connection flexible substrate (fourth substrate) 24B mounted to the second electrode substrate 114B. The short-circuit flexible substrate 25 includes a first short-circuit flexible substrate (third substrate) 25A mounted to the first electrode substrate 114A and a second short-circuit flexible substrate (fourth substrate) 25B mounted to the second electrode substrate 114B.

As illustrated in FIG. 6, the first external connection flexible substrate 24A is mounted to the left side portion in FIG. 6 of the first electrode substrate 114A and the first short-circuit flexible substrate 25A is mounted to the right side portion in FIG. 6 of the first electrode substrate 114A. The first external connection flexible substrate 24A is provided with two first external connection wiring lines 121A, two first short-circuit wiring lines 122A, and seven (the number of first electrodes 115A minus the number of first antenna electrodes 119A) first ground connection portions 118A. Three first short-circuit wiring lines 122A are provided on the first short-circuit flexible substrate 25A. Therefore, six of the first electrodes 115A are connected to the first antenna circuit 117A according to the present embodiment as first antenna electrodes 119A. More specifically, according to FIG. 6, the six first antenna electrodes 119A are made up of the second first electrode 115A, the third first electrode 115A, the fourth first electrode 115A, the sixth first electrode 115A, the seventh first electrode 115A, and the eighth first electrode 115A counting from the upper edge in FIG. 6. Thus, when the six first antenna electrodes 119A are energized, magnetic fields are generated in the first spaces SP1 disposed overlapping the fifth first electrode 115A, the fifth first touch electrode 113A, and the sixth first touch electrode 113A counting from the upper edge in FIG. 6.

As illustrated in FIG. 7, the second external connection flexible substrate 24B is mounted to the lower side portion in FIG. 7 of the second electrode substrate 114B and the second short-circuit flexible substrate 25B is mounted to the upper side portion in FIG. 7 of the second electrode substrate 114B. The second external connection flexible substrate 24B is provided with two first external connection wiring lines 121A, one second short-circuit wiring line 122B, and six (the number of second electrodes 115B minus the number of second antenna electrodes 119B) second ground connection portions 118B. Two second short-circuit wiring lines 122B are provided on the second short-circuit flexible substrate 25B. Thus, four of the second electrodes 115B are connected to the second antenna circuit 117B according to the present embodiment as second antenna electrodes 119B. More specifically, as illustrated in FIG. 7, the four second antenna electrodes 119B are made up of the third second electrode 115B, the fourth second electrode 115B, the sixth second electrode 115B, and the seventh second electrode 115B counting from the left edge in FIG. 7. Thus, when the four second antenna electrodes 119B are energized, magnetic fields are generated in the second spaces SP2 disposed overlapping the fifth second electrode 115B, the fifth second touch electrode 113B, and the sixth second touch electrode 113B counting from the left edge in FIG. 7, The magnetic field generated in the first space SP1 described above tends to be stronger than the magnetic field generated in the second space SP2. Further, the first space SP1 and the second space SP2 according to the present embodiment have a smaller width dimension than the first space SP1 and the second space SP2 according to the first embodiment described above.

Figure 8:
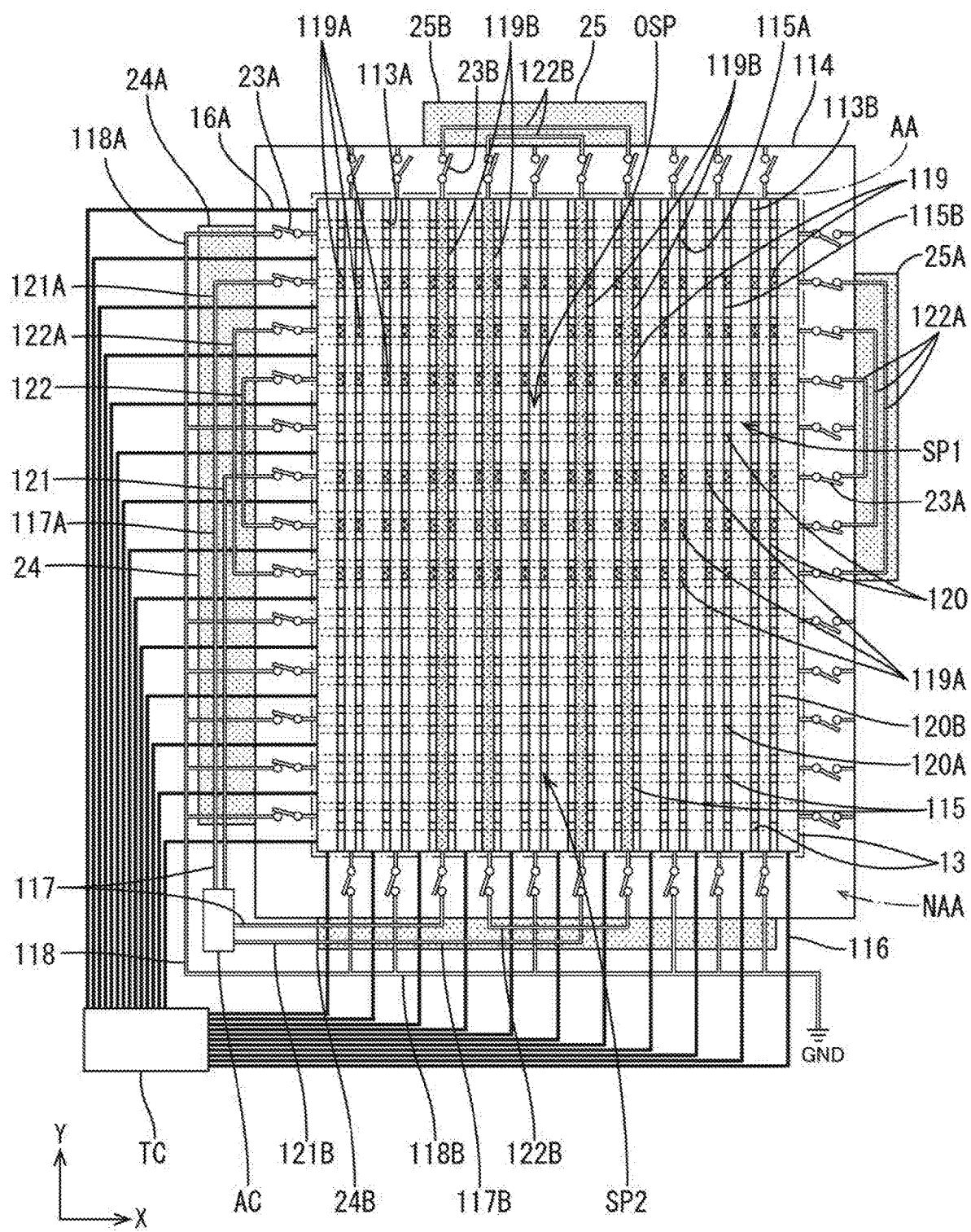
FIG. 8 is a plan view of a touch panel when an antenna circuit is in an energized state.

When the external connection flexible substrate 24 and the short-circuit flexible substrate 25 having the configuration described above are mounted to the electrode substrate 114, as illustrated in FIGS. 6 and 7, the external connection wiring line 121 and the short-circuit wiring line 122 are connected to the electrode switches 23 located at the mounting positions of the external connection flexible substrate 24 and the short-circuit flexible substrate 25. At this time, of the plurality of electrodes 115, a particular electrode 115 connected to the external connection wiring line 121 and the short-circuit wiring line 122 via the electrode switch 23 is selectively set as the antenna electrode 119. Note that, among the electrode switches 23, all electrode switches 23 disposed closer to the external connection flexible substrate 24 in the X-axis direction with respect to the electrode 115 are ON, and some of the electrode switches 23 disposed closer to the short-circuit flexible substrate 25 in the X-axis direction with respect to the electrode 115 are selectively ON and some are OFF depending on the mounting position of the short-circuit flexible substrate 25. When a pulse is output from the antenna controller AC in this state, as illustrated in FIG. 8, the antenna electrode 119 is energized via the external connection wiring lines 121 and the short-circuit wiring lines 122 constituting the antenna circuit 117, and the electrode switch 23. Note that in FIG. 8, the antenna electrodes 119 of the plurality of electrodes 115 are illustrated as shaded. Then, magnetic fields are generated in the first spaces SP1 present between the six first antenna electrodes 119A and magnetic fields are generated in the second spaces SP2 present between the four second antenna electrodes 119B. The magnetic fields generated in the first spaces SP1 and the second spaces SP2 exhibit a strong interaction in the overlapping space OSP to generate a stronger magnetic field in the overlapping space OSP than in a non-overlapping space. This strong magnetic field can be used to stably perform near field wireless communication with an external device. Further, the dummy electrodes 120 of the plurality of electrodes 115 are connected to the ground connection portion 118 of the external connection flexible substrate 24 via the electrode switch 23 to be supplied with ground potential. Note that the transmission circuits and the like of the pulses output from the antenna controller AC to each of the antenna electrodes 119A, 119B are as described above in the first embodiment.

Incidentally, in the touch panel 112 according to the present embodiment, the circuit design (circuit configuration) of the external connection flexible substrate 24 can be changed, and the mounting position of the short-circuit flexible substrate 25 on the electrode substrate 114 can be changed from the position illustrated in FIGS. 6 to 8. When the circuit design of the external connection flexible substrate 24 are changed and mounting position of the short-circuit flexible substrate 25 on the electrode substrate 114 is changed, the electrode switches 23 connected to the external connection wiring lines 121 and the short-circuit wiring lines 122 are changed and which electrodes 115 of the plurality of electrodes 115 are the antenna electrodes 119 also changes.

Figure 9:
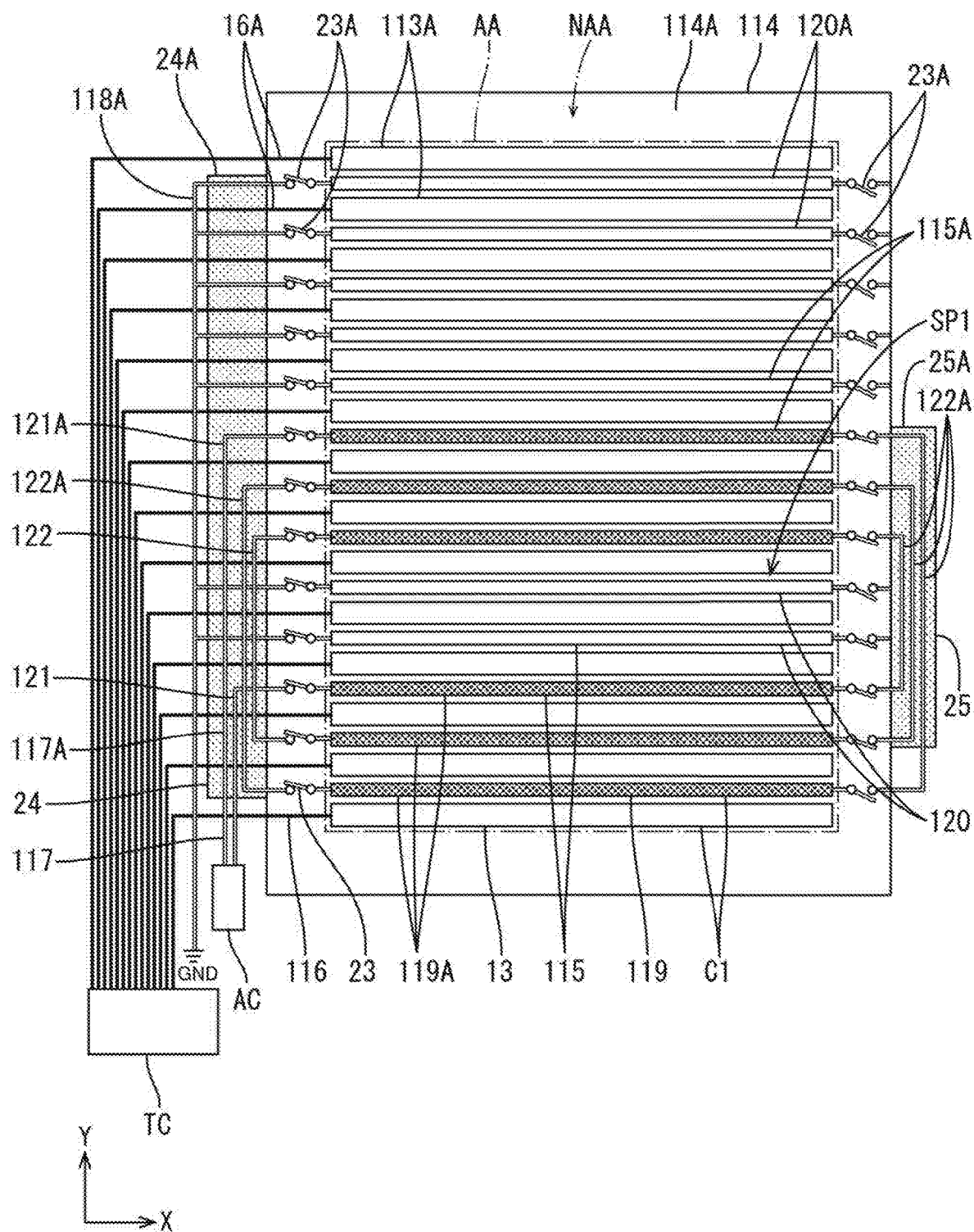
FIG. 9 is a plan view illustrating a state where the circuit design of a first external connection flexible substrate has been changed and the mounting position of a first short-circuit flexible substrate on a first electrode substrate has been changed.

Specifically, for example, as illustrated in FIG. 9, the first external connection flexible substrate 24A has a circuit design in which the sixth first electrode 115A and the eleventh first electrode 115A counting from the upper edge in FIG. 9 are connected to two first external connection wiring lines 121A as first antenna electrodes 119A, and the seventh first electrode 115A, the eighth first electrode 115A, the twelfth first electrode 115A, and the thirteenth first electrode 115A counting from the upper edge in FIG. 9 are connected to two first short-circuit wiring lines 122A as first antenna electrodes 119A. Thus, the mounting position of the first short-circuit flexible substrate 25A on the first electrode substrate 114A is changed to near the lower edge in FIG. 9. With this configuration, the sixth first electrode 115A, the seventh first electrode 115A, the eighth first electrode 115A, the eleventh first electrode 115A, the twelfth first electrode 115A, and the thirteenth first electrode 115A counting from the upper edge in FIG. 9 are connected to three first short-circuit wiring lines 122A provided, on the first short-circuit flexible substrate 25A as first antenna electrodes 119A. Thus, when the six first antenna electrodes 119A are energized, magnetic fields are generated in the first spaces SP1 disposed overlapping the ninth first electrode 115A, the tenth first electrode 115A, the ninth first touch electrode 113A, the tenth first touch electrode 113A, and the eleventh first touch electrode 113A counting from the upper edge in FIG. 9. The first space SP1 illustrated in FIG. 9 has a width dimension greater than that of the first space SP1 illustrated in FIG. 6 according to the first embodiment. Note that electrodes other than the above-described plurality of first electrodes 115A are connected to the first ground connection portion 118A as first dummy electrodes 120A.

Figure 10:
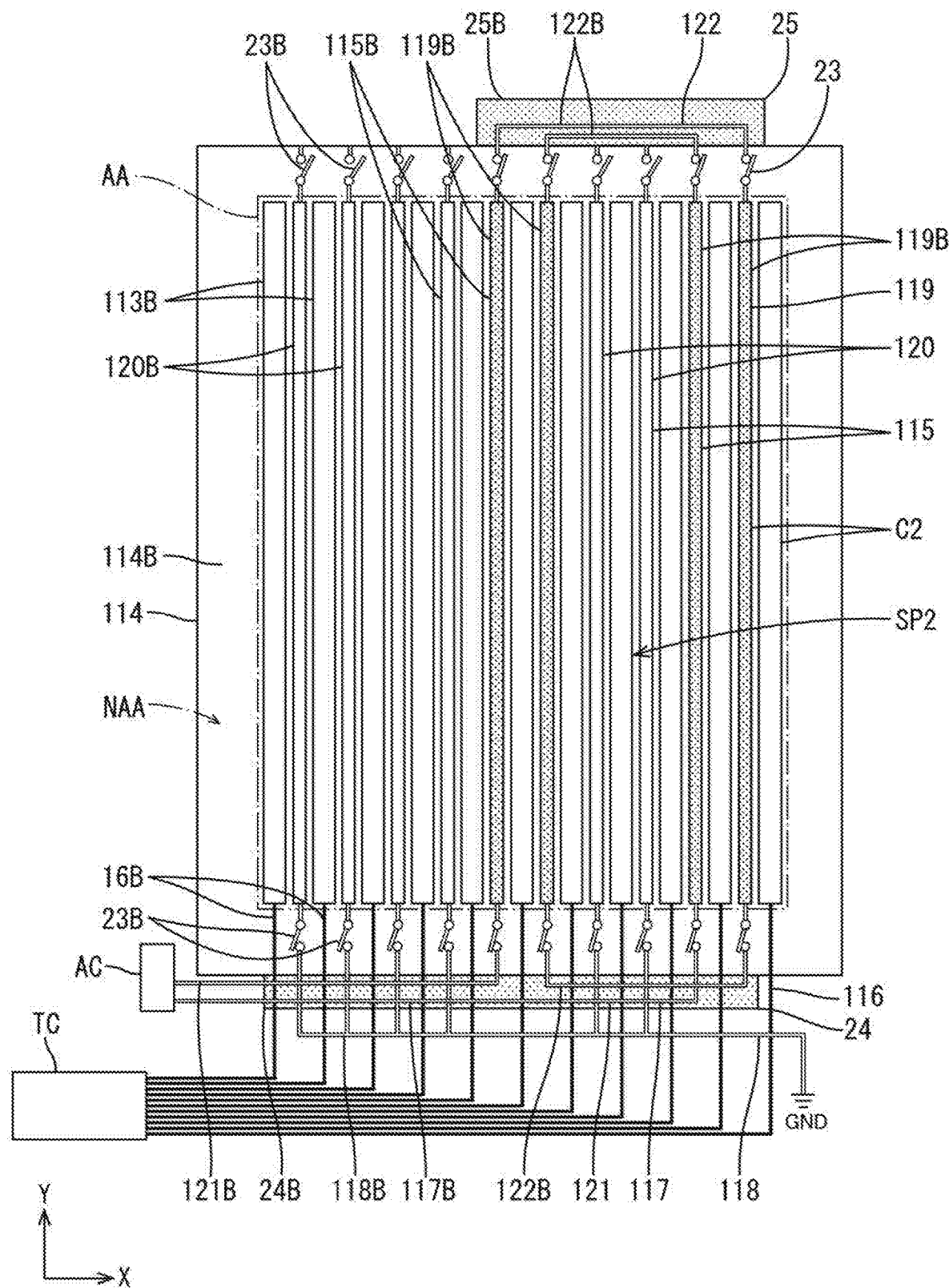
FIG. 10 is a plan view illustrating a state where the circuit design of a second external connection flexible substrate has been changed and the mounting position of a second short-circuit flexible substrate on a second electrode substrate has been changed.

On the other hand, for example, as illustrated in FIG. 10, the second external connection flexible substrate 24B has a circuit design in which the fifth second electrode 115B and the ninth second electrode 115B counting from the upper edge in FIG. 10 are connected to two second external connection wiring lines 121B as second antenna electrodes 119B, and the sixth second electrode 115B and the tenth second electrode 115B counting from the upper edge in FIG. 10 are connected to two second short-circuit wiring lines 122B as second antenna electrodes 119B. Thus, the mounting position of the second short-circuit flexible substrate 25B on the second electrode substrate 114B is changed to near the right edge in FIG. 10. With this configuration, the fifth second electrode 115B, the sixth second electrode 115B, the ninth second electrode 115B, and the tenth second electrode 115B counting from the left edge in FIG. 10 are connected to two second short-circuit wiring lines 122B provided on the second short-circuit flexible substrate 25B as second antenna electrodes 119B. Thus, when the four second antenna electrodes 119B are energized, magnetic fields are generated in the second spaces SP2 disposed overlapping the seventh second electrode 115B, the eighth second electrode 115B, the seventh second touch electrode 113B, the eighth second touch electrode 113B, and the ninth second touch electrode 113B counting from the left edge in FIG. 10. The second space SP2 illustrated in FIG. 10 has a larger width dimension than the second space SP2 illustrated in FIG. 7 according to the first embodiment. Note that electrodes other than the above-described plurality of second electrodes 115B are connected to the second ground connection portion 118B as second dummy electrodes 120B.

Figure 11:
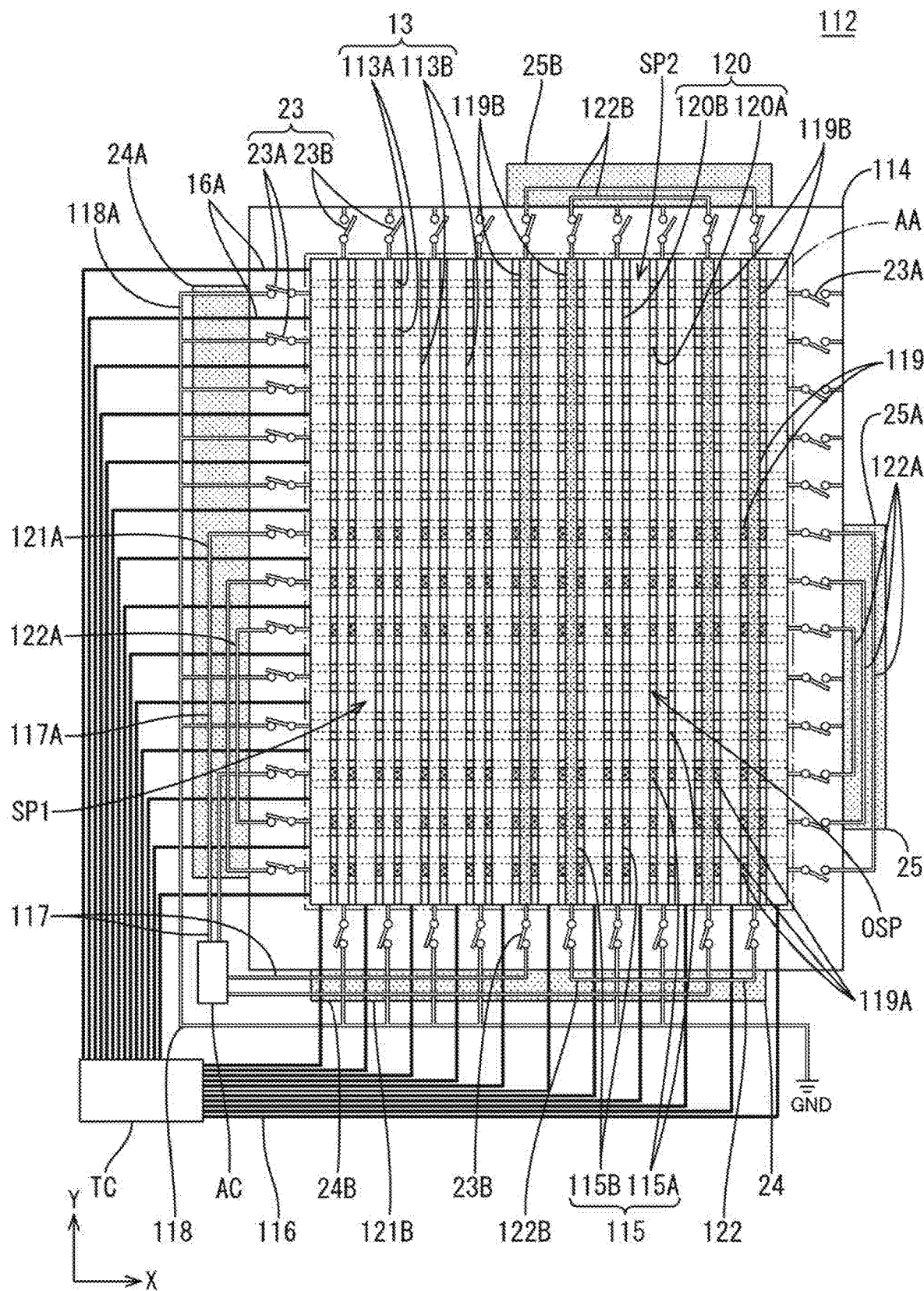
FIG. 11 is a plan view of a touch panel when an antenna circuit is in an energized state.

Further, as illustrated in FIG. 11, the range of the overlapping space OSP in which the first space SP1 and the second space SP2 overlap and a particularly strong magnetic field is generated is expanded to two times that in FIG. 8 in both the X-axis direction and the Y-axis direction. This increases the range in which near field wireless communication is stably performed and improves design flexibility of software used to perform signal processing in accordance with near field wireless communication. By changing the circuit design of the external connection flexible substrate 24 and the mounting position of the short-circuit flexible substrate 25 on the electrode substrate 114 in this way, the position at which the antenna function is achieved on the plate surface of the touch panel 112 can be changed as appropriate. Note that the specific circuit design of the external connection flexible substrate 24 and the specific mounting position of the short-circuit flexible substrate 25 on the electrode substrate 114 can be changed as appropriate to something other than that illustrated in FIGS. 9 to 11.

As described above, according to the present embodiment, the touch panel includes a plurality of first electrodes 115A extending in the first direction and disposed adjacent to each of the plurality of first touch electrodes 113A, a portion of the plurality of first electrodes 115A constituting the plurality of first antenna electrodes 119A, a plurality of second electrodes 115B extending in the second direction and disposed adjacent to each of the plurality of second touch electrodes 113B, a portion of the plurality of second electrodes 115B constituting the plurality of second antenna electrodes 119B, a first electrode substrate (first substrate) 114A provided with at least the plurality of first touch electrodes 113A and the plurality of first electrodes 115A, a second electrode substrate (second substrate) 114B provided with at least the plurality of second touch electrodes 113B and the plurality of second electrodes 115B, a first external connection flexible substrate 24A and a first short-circuit flexible substrate 25A (third substrate) including the antenna circuit 117 and mounted to the first electrode substrate 114A, the antenna circuit 117 being selectively connected to a particular first electrode 115A of the plurality of first electrodes 115A, and a second external connection flexible substrate 24B and a first short-circuit flexible substrate 25B (fourth substrate) including the antenna circuit 117 and mounted to the second electrode substrate 114B, the antenna circuit 117 being selectively connected to a particular second electrode 115B of the plurality of second electrodes 115B. With this configuration, when the first external connection flexible substrate 24A and the first short-circuit flexible substrate 25A are mounted to the first electrode substrate 114A and the second external connection flexible substrate 24B and the second short-circuit flexible substrate 25B are mounted on the second electrode substrate 114B, the antenna circuit 117 is selectively connected to a particular first electrode 115A of the plurality of first electrodes 115A and the antenna circuit 117 is selectively connected to a particular specific second electrode 115B of the plurality of second electrodes 115B. The first electrodes 115A and the second electrodes 115B energized by the antenna circuit 117 function as first antenna electrodes 119A and second antenna electrodes 119B, respectively. Thus, by selecting the mounting position of the first short-circuit flexible substrate 25A on the first electrode substrate 114A and the mounting position of the second short-circuit flexible substrate 25B on the second electrode substrate 114B, and changing the circuit design of the antenna circuit 117 provided on the first external connection flexible substrate 24A and the circuit design of the antenna circuit 117 provided on the second external connection flexible substrate 24B, the first electrode 115A of the plurality of first electrodes 115A to function as the first antenna electrode 119A and the second electrode 115B of the plurality of second electrodes 115B to function as the second antenna electrode 119B can be set as appropriate. As a result, convenience is excellent.

In addition, the first external connection flexible substrate 24A is provided with a first ground connection portion 118A connected to a first electrode 115A of the plurality of first electrodes 115A that is not connected to the antenna circuit 117, the first ground connection portion 118A being configured to supply ground potential, and the second external connection flexible substrate 24B is provided with a second ground connection portion 118B connected to a second electrode 115B of the plurality of second electrodes 115B that is not connected to the antenna circuit 117, the second ground connection portion 118B being configured to supply ground potential. With this configuration, when the first external connection flexible substrate 24A is mounted to the first electrode substrate 114A and the second external connection flexible substrate 24B is mounted to the second electrode substrate 114B, the first ground connection portion 118A is connected to a first electrode 115A among the plurality of first electrodes 115A not connected to the antenna circuit 117, and the second ground connection portion 118B is connected to a second electrode 115B among the plurality of second electrodes 115B not connected to the antenna circuit 117. The first electrodes 115A and the second electrodes 115B connected to the first ground connection portion 118A and the second ground connection portion 118B are each supplied with ground potential. Thus, potential fluctuations are less likely to occur in these electrodes and the first electrode 115A and the second electrode 115B, which are not connected to the antenna circuit 117, can be prevented from becoming a source of noise. This makes it less likely for the position detection performance of the position detection circuit 116 to deteriorate.

Third Embodiment

A third embodiment of the present disclosure will be described with reference to FIGS. 12 to 17. In the third embodiment, the configuration of an external connection flexible substrate 224 and a short-circuit flexible substrate 225 are changed from that in the second embodiment described above. Note that redundant descriptions of structures, actions, and effects similar to those of the second embodiment described above will be omitted. Further, illustrations of the position detection circuit and the touch controller are incorporated in the drawings described above in the first embodiment.

Figure 12:
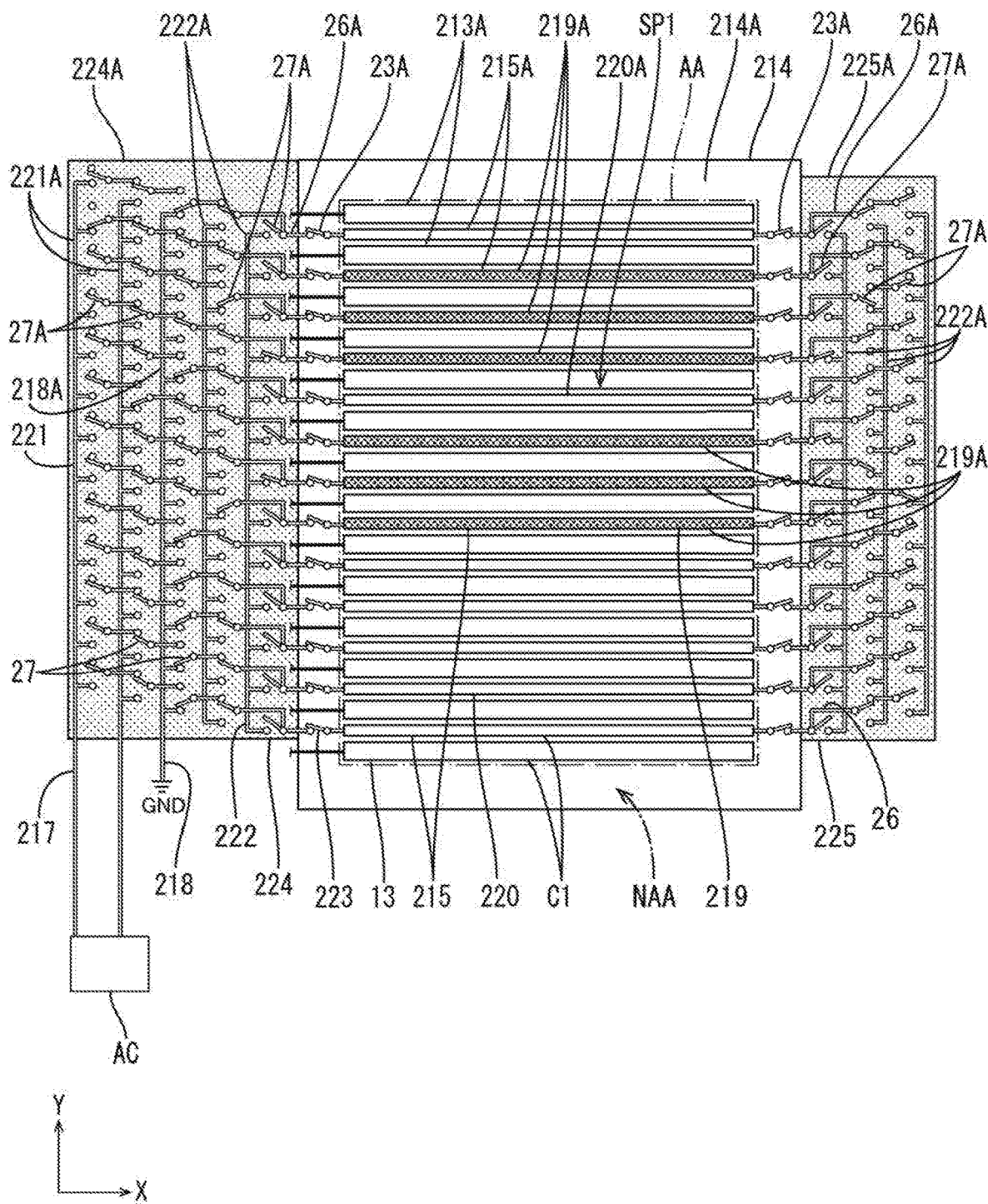
FIG. 12 is a plan view of a first electrode substrate constituting touch panel according to a third embodiment of the present disclosure.
Figure 13:
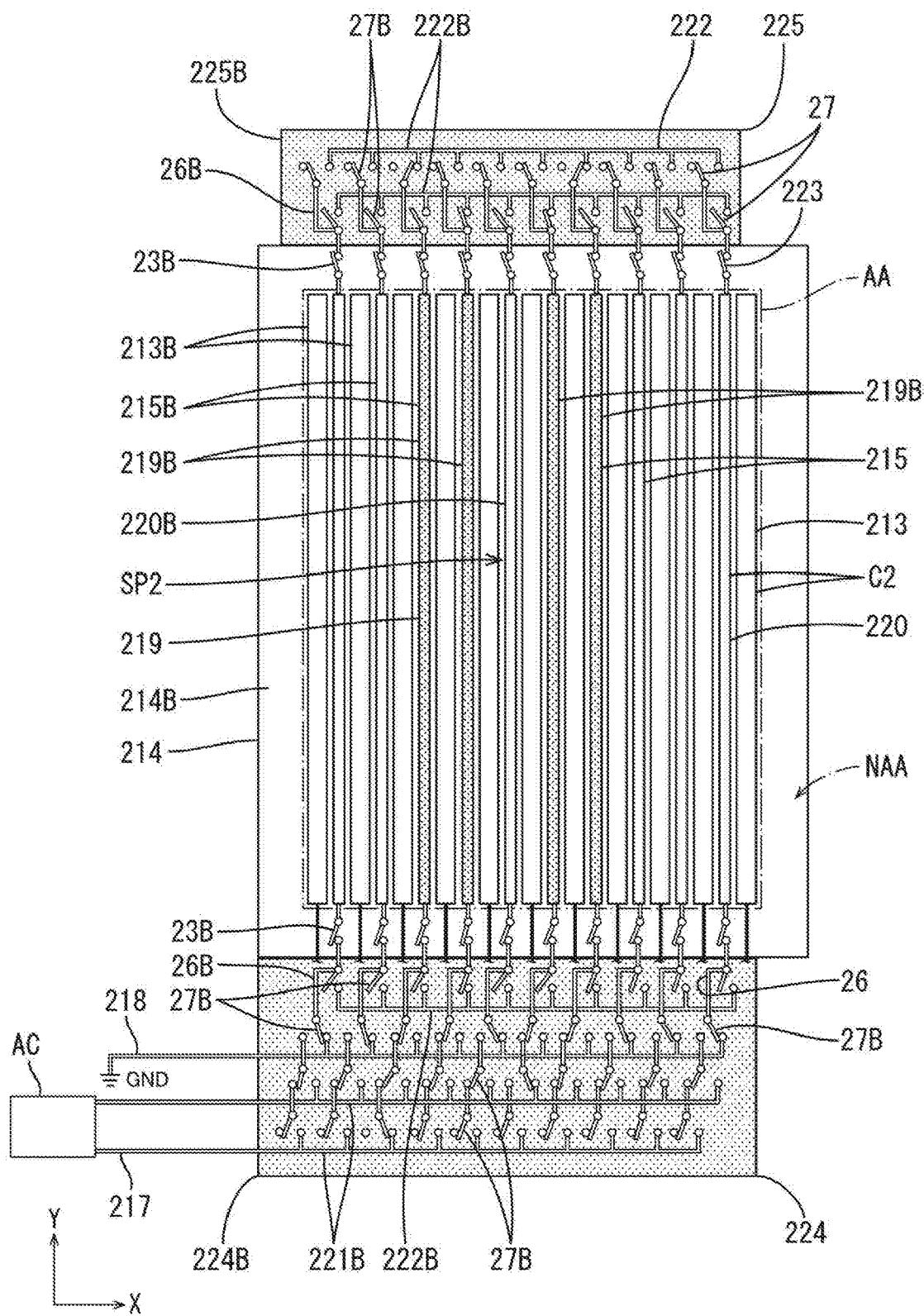
FIG. 13 is a plan view of a second electrode substrate constituting a touch panel.

As illustrated in FIGS. 12 and 13, the external connection flexible substrate 224 and the short-circuit flexible substrate 225 according to the present embodiment include a plurality of electrode connection portions 26 respectively connected to the plurality of electrodes 215 via a plurality of electrode switches 223, and a plurality of switches 27 connected to the external connection wiring lines 221 and the short-circuit wiring lines 222 constituting an antenna circuit 217, a ground connection portion 218, and the plurality of electrode connection portions 26. The plurality of electrode connection portions 26 are connected to the plurality of electrode switches 223 when the external connection flexible substrate 224 and the short-circuit flexible substrate 225 are mounted to the electrode substrate 214. The number of electrode connection portions 26 included in the external connection flexible substrate 224 and the short-circuit flexible substrate 225 is the same as the number of electrode switches 223 to be connected. Accordingly, the length dimensions of the external connection flexible substrate 224 and the short-circuit flexible substrate 225 are similar to the length dimension of the side of the electrode substrate 214 on which the external connection flexible substrate 222 and the short-circuit flexible substrate 225 are mounted. Thus, the short-circuit flexible substrate 225 according to the present embodiment differs from the second embodiment described above in that the mounting position of the short-circuit flexible substrate 225 on the electrode substrate 214 is fixed. The electrode connection portion 26 includes a first electrode connection portion 26A provided on a first external connection flexible substrate 224A and a first short-circuit flexible substrate 225A mounted to the first electrode substrate 214A, and a second electrode connection portion 26B provided on a second external connection flexible substrate 224B and a second short-circuit flexible substrate 225B mounted to the second electrode substrate 214B.

As illustrated in FIGS. 12 and 13, the plurality of electrode connection portions 26 are selectively connected to either the antenna circuit 217 (external connection wiring lines 221 and short-circuit wiring lines 222) or the ground connection portion 218 via the plurality of switches 27. The plurality of switches 27 include a switch 27 that switches connection between the external connection wiring line 221 and the electrode connection portion 26, a switch 27 that switches connection between the short-circuit wiring lines 222 and the electrode connection portion 26, and a switch 27 that switches connection between the ground connection portion 218 and the electrode connection portion 26. Thus, by controlling the switching states of the switches 27, a particular electrode 215 of the plurality of electrodes 215 can be set as the antenna electrode 219 to achieve the antenna function as appropriate.

Specifically, the electrodes 215 connected to the electrode connection portion 26 connected to the external connection wiring line 221 via the switch 27 and the electrode connection portion 26 connected to the short-circuit wiring line 222 via the switch 27 functions as the plurality of antenna electrodes 219, while the electrodes 215 connected to the electrode connection portion 26 connected to the ground connection portion 218 via the switch 27 are the plurality of dummy electrodes 220. With this configuration, the location and range of magnetic field generation by the antenna electrodes 219 can be changed as appropriate and noise can be appropriately prevented from occurring to improve convenience.

As illustrated in FIGS. 12 and 13, the number of installed switches 27 on the external connection flexible substrate 224 and the short-circuit flexible substrate 225 is a number obtained by multiplying the number of installed electrode connection portions 26 (electrodes 215) by the total number of installed external connection wiring lines 221, short-circuit wiring lines 222 and ground connection portions 218 on each substrate 224, 225. Specifically, the number of installed switches 27 on the external connection flexible substrate 224 is a number obtained by multiplying the number of installed electrode connection portions 26 by the total number (5) of installed external connection wiring lines 221, short-circuit wiring lines 222 and ground connection portions 218. The number of installed switches 27 on the short-circuit flexible substrate 225 is a number obtained by multiplying the number of installed electrode connection portions 26 by the number (3) of installed short-circuit wiring lines 222. The plurality of switches 27 include a plurality of first switches 27A provided on the first external connection flexible substrate 224A and the first short-circuit flexible substrate 225A, and a second switch connection portion 27B provided on a second external connection flexible substrate 224B mounted to a second electrode substrate 214B and the second short-circuit flexible substrate 225B. Note that the switch 27 may be either a mechanical switch or an electronic switch provided that the switch 27 can transmit the pulses provided to the antenna circuit 217.

Further, the switch 27 is connected to a switch controller such that the switching state of the switch 27 is mechanically or electronically controlled by the switch controller.

Figure 14:
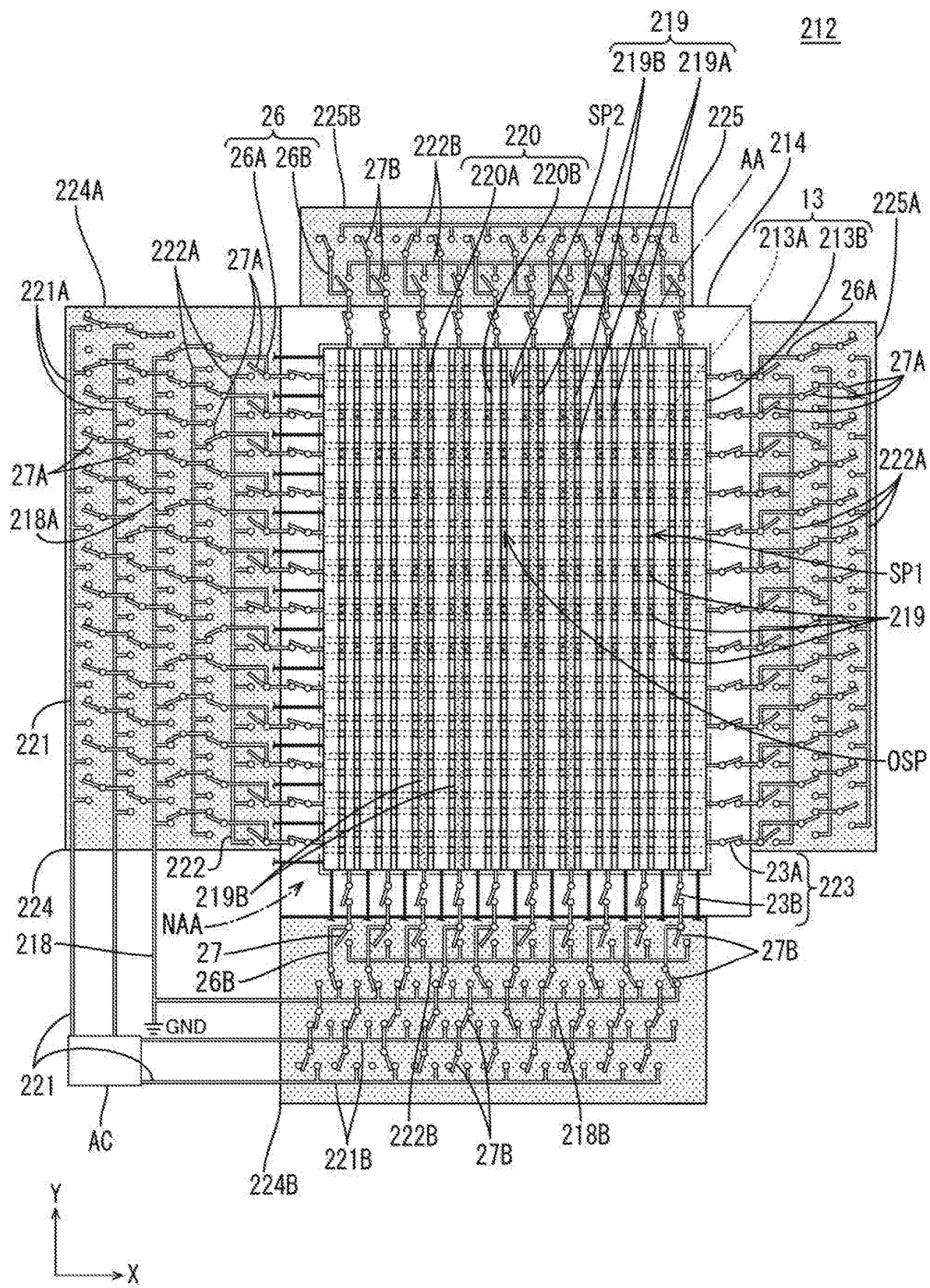
FIG. 14 is a plan view of a touch panel when an antenna circuit is in an energized state.

When the external connection flexible substrate 224 and the short-circuit flexible substrate 225 having the configuration described above are mounted to the electrode substrate 214, as illustrated in FIGS. 12 and 13, the plurality of electrode connection portions 26 are individually connected to the plurality of switches 223. By adjusting the switching states of each of the plurality of switches 27 included on the external connection flexible substrate 224 and the short-circuit flexible substrate 225, the electrode connection portion 26 connected to the external connection wiring line 221 and the short-circuit wiring line 222 constituting the antenna circuit 217 and the ground connection portion 218 can be set as desired. When the switching states of the switches 27 are as illustrated in FIGS. 12 and 13, the same electrodes 215 as described above in the second embodiment are the antenna electrodes 219. When a pulse is output from the antenna controller AC in this state, as illustrated in FIG. 14, the antenna electrodes 219 are energized via the external connection wiring lines 221 and the short-circuit wiring lines 222 constituting the antenna circuit 217, the electrode switch 223, the electrode connection portion 26, and the switches 27. In FIG. 14, the antenna electrodes 219 among the plurality of electrodes 215 are illustrated as shaded. Magnetic fields are generated in the first spaces SP1 present between six first antenna electrodes 219A, and magnetic fields are generated in the second spaces SP2 between four second antenna electrodes 219B. The magnetic fields generated in the first spaces SP1 and the second spaces SP2 exhibit a strong interaction in the overlapping space OSP to generate a stronger magnetic field in the overlapping space OSP than in a non-overlapping space. This strong magnetic field can be used to stably perform near field wireless communication with an external device. The dummy electrode 220 of the plurality of electrodes 215 is connected to the ground connection portion 218 of the external connection flexible substrate 224 to be supplied ground potential via the electrode switch 223, the electrode connection portion 26 and the switches 27. Note that the transmission circuits and the like of the pulses output from the antenna controller AC to each of the antenna electrodes 219A, 219B are as described above in the first embodiment.

Incidentally, in the touch panel 212 according to the present embodiment, even after the external connection flexible substrate 224 and the short-circuit flexible substrate 225 are mounted to the electrode substrate 214, which electrodes 215 of the plurality of electrodes 215 are to be used as the antenna electrodes 219 can be changed as desired. In order to change the antenna electrode 219, it is only necessary to adjust the switching states of each of the plurality of switches 27 included in the external connection flexible substrate 224 and the short-circuit flexible substrate 225 and change the electrode connection portion 26 connected to the external connection wiring line 221 and the short-circuit wiring line 222 constituting the antenna circuit 217 and the ground connection portion 218. During this change, for example, a switching signal is input to the switch controller that controls the switching states of the switches 27. Inputting a switching signal to the switch controller changes the switching states of the switch 27 that switches connection between the external connection wiring line 221 and the electrode connection portion 26, the switch 27 that switches connection between the short-circuit wiring line 222 and the electrode connection portion 26, and the switch 27 that switches connection between the ground connection portion 218 and the electrode connection portion 26.

Figure 15:
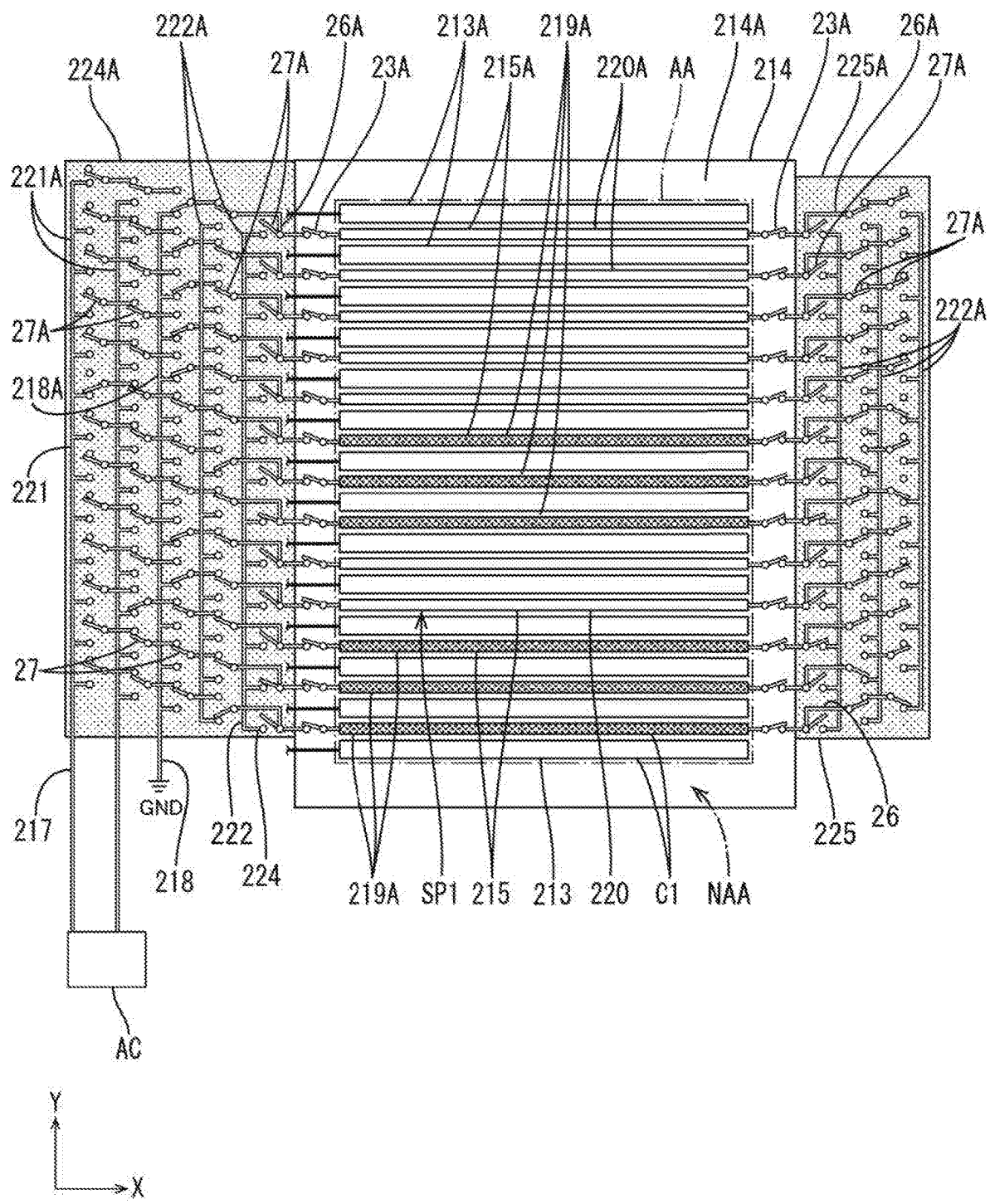
FIG. 15 is a plan view of a touch panel when the switching state of a first switch has been changed.

Specifically, as illustrated in FIG. 15, when a switching signal is input to the switch controller on the first electrode substrate 214A, the sixth first electrode 215A and the eleventh first electrode 215A counting from the top edge in FIG. 15 connect to two first external connection wiring lines 221A as first antenna electrodes 219A, and the seventh first electrode 215A, the eighth first electrode 215A, the twelfth first electrode 215A, and the thirteenth first electrode 215A counting from the upper edge in FIG. 15 connect to two first short-circuit wiring lines 222A as first antenna electrodes 219A. In contrast, on the first short-circuit flexible substrate 225A, the sixth first electrode 215A, the seventh first electrode 215A, the eighth first electrode 215A, the eleventh first electrode 215A, the twelfth first electrode 215A, and the thirteenth first electrode 215A counting from the top edge in FIG. 15 connect to three first short-circuit wiring lines 222A included in the first short-circuit flexible substrate 225A as first antenna electrodes 219A. Thus, when these six first antenna electrodes 219A are energized, magnetic fields are generated in the first spaces SP1 disposed overlapping the ninth first electrode 215A, the tenth first electrode 215A, the ninth first touch electrode 213A, the tenth first touch electrode 213A, and the eleventh first touch electrode 213A counting from the top edge in FIG. 15. The first space SP1 illustrated in FIG. 15 is described as having the same width dimension and position in the Y-axis direction as the first space SP1 illustrated in FIG. 9 according to the second embodiment, but the width dimension and position in the Y-axis direction of the first space SP1 may be changed as appropriate by further changing the switching state of each switch 27. Other electrodes among the plurality of first electrodes 215A are connected to the first ground connection portion 218A via the electrode switch 223, the electrode connection portion 26 and the switch 27 as first dummy electrodes 220A.

Figure 16:
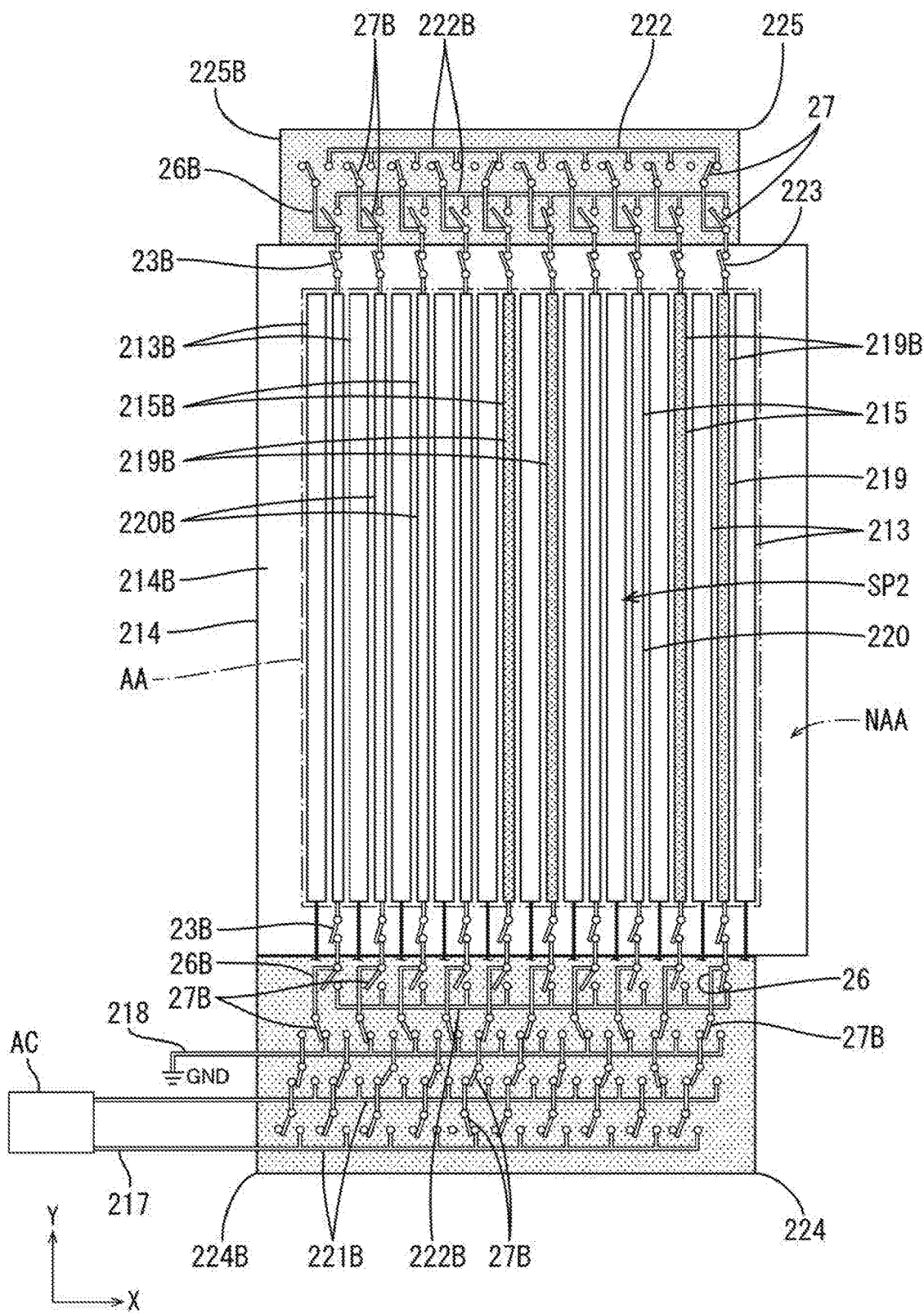
FIG. 16 is a plan view of a touch panel when the switching state of a second switch has been changed.

On the second external connection flexible substrate 224B, as illustrate in FIG. 16 for example, the fifth second electrode 215B and the ninth second electrode 215B counting from the left edge in FIG. 16 connect to two second external connection wiring lines 221B as second antenna electrodes 219B, and the sixth second electrode 215B and the tenth second electrode 215B counting from the left edge in FIG. 16 connect to the second short-circuit wiring lines 222B as second antenna electrodes 219B. In contrast, on the second short-circuit flexible substrate 225B, the fifth second electrode 215B, the sixth second electrode 215B, the ninth second electrode 215B, and the tenth second electrode 215B counting from the left edge in FIG. 16 connect to two second short-circuit wiring lines 222B included in the second short-circuit flexible substrate 225B as second antenna electrodes 219B. Thus, when the four second antenna electrodes 219B are energized, magnetic fields are generated in the second spaces SP2 disposed overlapping the seventh second electrode 215B, the eighth second electrode 215B, the seventh second touch electrode 213B, the eighth second touch electrode 213B, and the ninth second touch electrode 213B counting from the left edge in FIG. 16. The second space SP2 illustrated in FIG. 16 is described as having the same width dimension and position in the Y-axis direction as the second space SP2 illustrated in FIG. 10 according to the second embodiment, but the width dimension and position in the Y-axis direction of the second space SP2 may be changed as appropriate by further changing the switching state of each switch 27. Other electrodes among the plurality of second electrodes 215B are connected to the second ground connection portion 218B via the electrode switch 223, the electrode connection portion 26 and the switch 27 as second dummy electrodes 220B.

Figure 17:
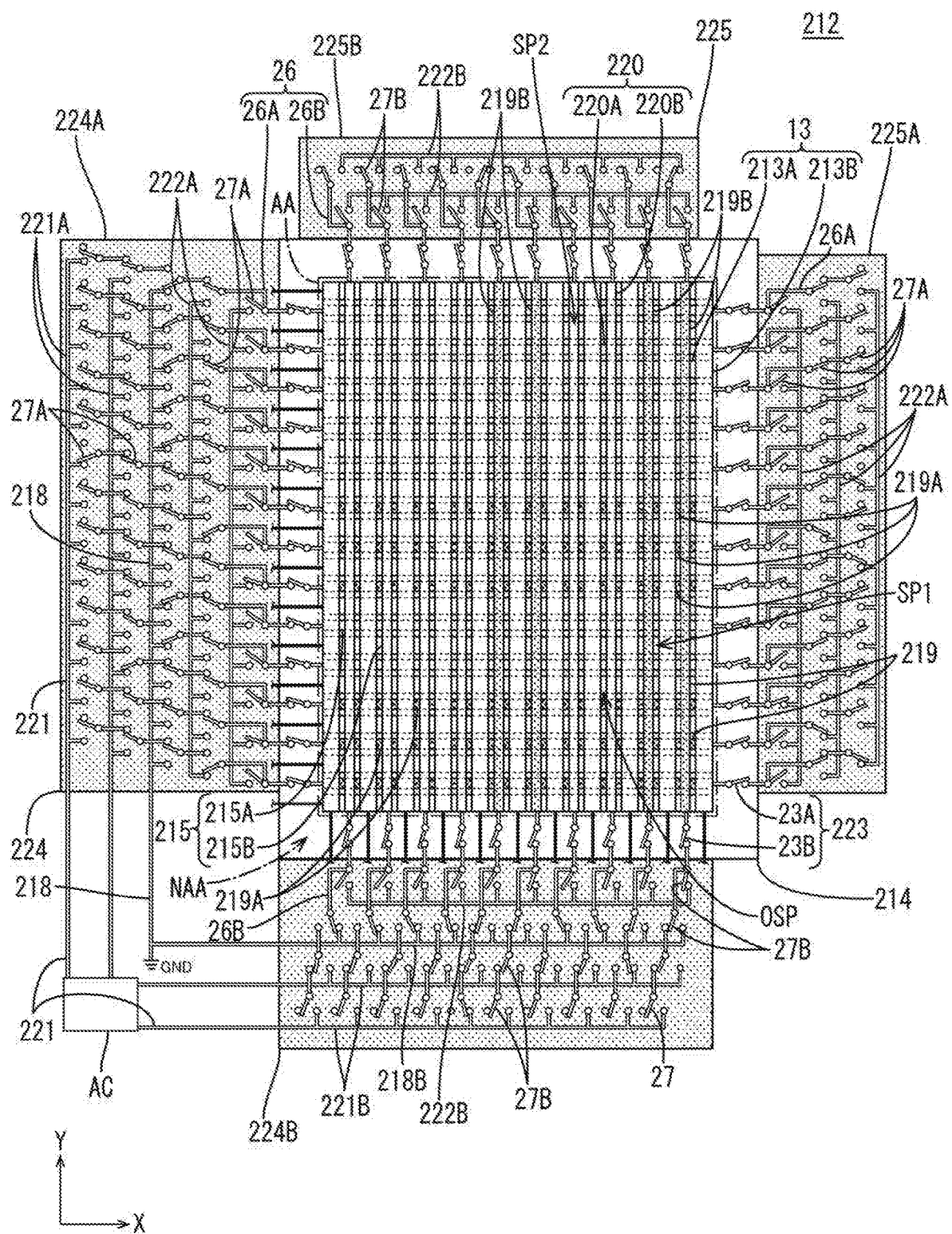
FIG. 17 is a plan view of a touch panel when an antenna circuit is in an energized state.

Further, as illustrated in FIG. 17, the overlapping space OSP in which the first space SP1 and the second space SP2 overlap and in which a particularly strong magnetic field is generated changes from the position illustrated in FIG. 14 to a lower right position and expands in both the X-axis direction and the Y-axis direction. This increases the range in which near field wireless communication is stably performed and improves design flexibility of software used to perform signal processing in accordance with near field wireless communication. In this manner, the position and range at which antenna functions are displayed on the plate surface of the touch panel 212 can be appropriately changed by a software-based technique of adjusting the switching state of each switch 27. Thus, there is no need to employ a hardware-based technique for changing the circuit design of the external connection flexible substrate 24 and the mounting position of the short-circuit flexible substrate 25 as in the second embodiment. As a result, the position and range of the antenna function can be freely changed to provide easy usage. Specific patterns for the switching states of the switches 27 described above can be changed to that other than illustrated in FIGS. 12 to 17.

As described above, according to the present embodiment, the touch panel includes a plurality of first electrodes 215A extending in the first direction and disposed adjacent to each of the plurality of first touch electrodes 213A, a portion of the plurality of first electrodes 215A constituting the plurality of first antenna electrodes 219A, a plurality of first electrode connection portions 26A connected to each of the plurality of first electrodes 215A, a plurality of second electrodes 215B extending in the second direction and disposed adjacent to the plurality of second touch electrodes 213B, a portion of the plurality of second electrodes 215B constituting the plurality of second antenna electrodes 219B, a plurality of second electrode connection portions 26B connected to each of the plurality of second electrodes 215B, a plurality of first switches 27A connected to the antenna circuit 217 and each of the plurality of first electrode connection portions 26A, the plurality of first switches 27A configured to switch connection between the plurality of first electrode connection portions 26A and the antenna circuit 217, and a plurality of second switches 27B connected to the antenna circuit 217 and each of the plurality of second electrode connection portions 26B, the plurality of second switches 27B configured to switch connection between the plurality of second electrode connection portions 26B and the antenna circuit 217. With this configuration, each of the plurality of first switches 27A and second switches 27B switch connection between the plurality of first electrode connection portions 26A and second electrode connection portions 26B with respect to the antenna circuit 217. As a result, the first electrode 215A and the second electrode 215B connected to a particular first electrode connection portion 26A and a particular second electrode connection portion 26B connected to the antenna circuit 217 function as the first antenna electrode 219A and the second antenna electrode 219B, respectively. Thus, controlling the operation of each of the plurality of first switches 27A and second switches 27B makes it possible to appropriately set the first electrode 215A and the second electrodes 215B of the first electrodes 215A and the second electrodes 215B that are to function as the first antenna electrode 219A and the second antenna electrode 219B, respectively. As a result, the positions of the first space SP1 and the second space SP2 in which the magnetic fields are generated by the first antenna electrode 219A and the second antenna electrode 219B can be changed as desired.

In addition, the touch panel includes a first ground connection portion 218A connected to the plurality of first switches 27A and configured to supply ground potential to a first electrode connection portion 26A of the plurality of first electrode connection portions 26A that is not connected to the antenna circuit 217, and a second ground connection portion 218B connected to the plurality of second switches 27B and configured to supply ground potential to a second electrode connection portion 26B of the plurality of second electrode connection portions 26B that is not connected to the antenna circuit 217. With this configuration, the plurality of first electrode connection portions 26A and second electrode connection portions 26B include electrodes not connected to the antenna circuit 217 depending on the switching states of the first switches 27A and the second switches 27B. The first electrode connection portion 26A and the second electrode connection portion 26B, which are not connected to the antenna circuit 217, are connected to the first ground connection portion 218A and the second ground connection portion 218B via the first switch 27A and the second switch 27B, respectively, to be supplied with ground potential. The first electrode 215A and the second electrode 215B connected to the first ground connection portion 218A and the second ground connection portion 218B via the first electrode connection portion 26A and the second electrode connection portion 26B are supplied with ground potential and thus less likely to experience potential fluctuation. As a result, the first electrode 215A and the second electrode 215B, which are not connected to the antenna circuit 217, can be prevented from floating and becoming sources of noise. As a result, the position detection performance of the position detection circuit is less likely to degrade.

Other Embodiments

The present disclosure is not limited to the embodiments described above and illustrated by the drawings, and embodiments such as those described below are also included within the technical scope of the present disclosure.

(1) The specific number of antenna electrodes 19, 119, 219 included in the plurality of electrodes 15, 115, 215 can be changed as appropriate. For example, in the configuration described above in the first embodiment, five or more or three or less of the first antenna electrodes 19A, 119A, 219A and the second antenna electrodes 19B, 119B, 219B may be provided. In the configuration described above in the second and third embodiments, seven or more or five or less first antenna electrodes 19A, 119A, 219A may be provided, and five or more or three or less second antenna electrodes 19B, 119B, 219B may be provided. As the number of antenna electrodes 19, 119, 219 is changed, the number of short-circuit wiring lines 22, 122, 222 may be changed accordingly. With this configuration, the range of adjustment related to the number of antenna electrodes 19, 119, 219 connected to the antenna circuit 17, 117, 217 can be increased, and the range of adjustment related to the strength of the magnetic field generated in the spaces can be increased.

(2) When changing the number of antenna electrodes 19, 119, 219 as in (1), the number of antenna electrodes 19, 119, 219 is preferably set to an even number ($2n$) in terms of installing all the external connection wiring lines 21, 121, 221 on one flexible substrate (external connection flexible substrate 24, 224), but this number may be different. That is, the number of antenna electrodes 19, 119, 219 may be an odd number ($2n+1$) greater than or equal to 3.

(3) In the configuration described above in the first embodiment, the number of first antenna electrodes 19A, 119A, 219A and the number of second antenna electrodes 19B, 119B, 219B may be different. In this case, the number of first antenna electrodes 19A, 119A, 219A may be larger or the number of second antenna electrodes 19B, 1199, 219B may be larger.

(4) in the configuration described above in the second and third embodiments, the number of first antenna electrodes 19A, 119A, 219A may be less than the number of second antenna electrodes 19B, 119B, 219B.

(5) In the configuration described in the second and third embodiments, the number of first antenna electrodes 19A, 119A, 219A and the number of second antenna electrodes 199, 119B, 219B may be the same.

(6) The specific number of first touch electrodes 13A, 113A, 213A and first electrodes 15A, 115A, 215A that overlap the first space SP1 present between the plurality of first antenna electrodes 19A, 119A, 219A can be changed as appropriate. In addition, the first electrode 15A, 115A, 215A may not overlap the first space SP1, and only the first touch electrode 13A, 113A, 213A may overlap the first space SP1.

(7) The specific number of second touch electrodes 13B, 113B, 213B and second electrodes 15B, 115B, 215B that overlap the second space SP2 present between the plurality of second antenna electrodes 19B, 119B, 219B can be changed as appropriate. In addition, the second electrode 15B, 115B, 215B may not overlap the second space SP2, and only the second touch electrode 13B, 113B, 213B may overlap the second space SP2.

(8) In the configuration described above in the second and third embodiments, among the electrode switches 23, 223 that form a pair sandwiching the electrode 15, 115, 215, the electrode switches 23, 223 located closer to the external connection flexible substrate 24, 224 provided with the ground connection portion 18, 118, 218 can be omitted.

(9) In the configuration described above in the second and third embodiments, the ground connection portion 18, 118, 218 may be provided on the short-circuit flexible substrate 25, 225. In this case, among the electrode switches 23, 223 that form a pair sandwiching the electrode 15, 115, 215, the electrode switches 23, 223 located closer to the short-circuit flexible substrate 25, 225 provided with the ground connection portion 18, 118, 218 can be omitted.

(10) Further, all of the electrode switches 23, 223 described above in the second and third embodiments can be omitted.

(11) In the above-described configuration according to the first embodiment, the ground connection portion 18, 118, 218 may be connected to the electrode 15, 115, 215 from the same side as the antenna circuit 17, 117, 217.

(12) The touch electrode 13 and the antenna electrode 19, 119, 219 may not be made of the same conductive film C1, C2. For example, an insulating film may be interposed between the conductive film constituting the touch electrode 13 and the conductive film constituting the antenna electrode 19, 119, 219.

(13) The conductive films C1, C2 constituting the touch electrode 13 and the antenna electrode 19, 119, 219 may be a material other than a mesh metal film, for example, a transparent electrode film.

(14) In addition to (13) above, the touch panel may be manufactured by using an imprint technique. Specifically, an imprint layer in a pre-cured state is formed first, a groove is formed on the front face of the imprint layer by pressing a mold against the imprint layer, and then the imprint layer is cured. The formation range of the groove is the same as the formation range of the touch electrode 13 and the electrode 15, 115, 215. Then, the touch electrode 13 and electrode 15, 115, 215 can be formed on the imprint layer provided that the groove is filled with conductive ink having electrical conductivity by using a squeegee or the like.

(15) Further, the ground connection portion 18, 118, 218 can be omitted. In this case, among the plurality of electrodes 15, 115, 215, all of the dummy electrodes 20, 120, 220 that are not antenna electrodes 19, 119, 219 float.

(16) The dummy electrode 20, 120, 220 may be omitted.

(17) The specific planar shape of the planar shapes of the touch electrode 13 and the electrode 15, 115, 215 can be changed as appropriate to, for example, a square, a diamond, a triangle, a circle, or an oval.

(18) The first electrode substrate 14A, 114A, 214B may be stacked on the rear side with respect to the second electrode substrate 14B, 114B, 214B.

(19) The specific outer shape of the touch panel 12, 112, 212 may be, for example, rectangular, square, circular, or oval.

(20) The touch panel pattern provided on the touch panel 12, 112, 212 may be a self-capacitance pattern in addition to a mutual capacitance pattern.

(21) The touch panel 12, 112, 212 may be an in-cell panel in which the touch electrodes 13 and other electrodes are included in the liquid crystal panel 11.

(22) The liquid crystal display device 10 may include a reflective liquid crystal panel 11 that displays information by using external light. In this case, the backlight device may be omitted. Further, the liquid crystal display device 10 may include a semi-transparent liquid crystal panel 11.

(23) The embodiment may be an organic EL display device including an organic EL display panel as a display panel instead of the liquid crystal display device 10. The specific type of the display panel can be changed as appropriate to another type of display panel.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A position detecting device including an antenna function comprising:
    a plurality of first position detection electrodes extending in a first direction and separated by spaces;
    a plurality of second position detection electrodes extending in a second direction orthogonal to the first direction and disposed overlapping the plurality of first position detection electrodes, the plurality of second position detection electrodes being separated by spaces;
    a position detection circuit configured to detect a position by energizing the plurality of first position detection electrodes and the plurality of second position detection electrodes and using electric fields generated between the plurality of first position detection electrodes and the plurality of second position detection electrodes;
    a plurality of first antenna electrodes extending in the first direction and disposed adjacent to the plurality of first position detection electrodes, the plurality of first antenna electrodes being separated by first spaces;
    a plurality of second antenna electrodes extending in the second direction and disposed adjacent to the plurality of second position detection electrodes, the plurality of second antenna electrodes being separated by second spaces that at least partially overlap the first spaces; and
    an antenna circuit configured to perform wireless communication by energizing the plurality of first antenna electrodes and the plurality of second antenna electrodes and using magnetic fields generated in the first spaces and the second spaces.

2. The position detecting device including an antenna function according to claim 1, further comprising:
    a first conductive film constituting the plurality of first position detection electrodes and the plurality of first antenna electrodes; and
    a second conductive film constituting the plurality of second position detection electrodes and the plurality of second antenna electrodes.

3. The position detecting device including an antenna function according to claim 2, further comprising:
    a first dummy electrode formed of the first conductive film, the first dummy electrode extending in the first direction and disposed at a position adjacent to the plurality of first position detection electrodes and where the plurality of first antenna electrodes are not disposed; and
    a second dummy electrode formed of the second conductive film, the second dummy electrode extending in the second direction and disposed at a position adjacent to the plurality of second position detection electrodes and where the plurality of second antenna electrodes are not disposed.

4. The position detecting device including an antenna function according to claim 3, further comprising:
    a first ground connection portion connected to the first dummy electrode and configured to supply ground potential to the first dummy electrode; and
    a second ground connection portion connected to the second dummy electrode and configured to supply ground potential to the second dummy electrode.

5. The position detecting device including an antenna function according to claim 2,
    wherein both the first conductive film and the second conductive film are formed of a metal film having a mesh shape.

6. The position detecting device including an antenna function according to claim 1,
    wherein the antenna circuit includes:
    a plurality of first external connection wiring lines configured to connect two first antenna electrodes included in the plurality of first antenna electrodes to an external antenna drive unit,
    a plurality of second external connection wiring lines configured to connect two second antenna electrodes included in the plurality of second antenna electrodes to the external antenna drive unit,
    a plurality of first short-circuit wiring lines configured to short-circuit two first antenna electrodes included in the plurality of first antenna electrodes and separated by the first space, and
    a plurality of second short-circuit wiring lines configured to short-circuit two second antenna electrodes included in the plurality of second antenna electrodes and separated by the second space,
    when the number of the plurality of first antenna electrodes is $2n$, two first external connection wiring lines and $(n-1)$ first short-circuit wiring lines are connectable to one end side of each of the plurality of first antenna electrodes, and n first short-circuit wiring lines are connectable to another end side of each of the plurality of first antenna electrodes, and when the number of the plurality of second antenna electrodes is 2n, two second external connection wiring lines and (n−1) second short-circuit wiring lines are connectable to one end side of each of the plurality of second antenna electrodes, and n second short-circuit wiring lines are connectable to another end side of each of the plurality of second antenna electrodes.

7. The position detecting device including an antenna function according to claim 1, wherein the plurality of first antenna electrodes are arranged such that the plurality of first position detection electrodes are present in the first spaces, and the plurality of second antenna electrodes are arranged such that the plurality of second position detection electrodes are present in the second spaces.

8. The position detecting device including an antenna function according to claim 1, further comprising:

a plurality of first electrodes extending in the first direction and disposed adjacent to each of the plurality of first position detection electrodes, a portion of the plurality of first electrodes constituting the plurality of first antenna electrodes;

a plurality of second electrodes extending in the second direction and disposed adjacent to each of the plurality of second position detection electrodes, a portion of the plurality of second electrodes constituting the plurality of second antenna electrodes;

a first substrate provided with at least the plurality of first position detection electrodes and the plurality of first electrodes;

a second substrate provided with at least the plurality of second position detection electrodes and the plurality of second electrodes;

a third substrate including the antenna circuit and mounted to the first substrate, the antenna circuit being selectively connected to a particular first electrode of the plurality of first electrodes; and a fourth substrate including the antenna circuit and mounted to the second substrate, the antenna circuit being selectively connected to a particular second electrode of the plurality of second electrodes.

9. The position detecting device including an antenna function according to claim 8, wherein the third substrate is provided with a first ground connection portion connected to a first electrode of the plurality of first electrodes that is not connected to the antenna circuit, the first ground connection portion being configured to supply ground potential, and the fourth substrate is provided with a second ground connection portion connected to a second electrode of the plurality of second electrodes that is not connected to the antenna circuit, the second ground connection portion being configured to supply ground potential.

10. The position detecting device including an antenna function according to claim 1, further comprising:

a plurality of first electrodes extending in the first direction and disposed adjacent to each of the plurality of first position detection electrodes, a portion of the plurality of first electrodes constituting the plurality of first antenna electrodes;

a plurality of first electrode connection portions connected to each of the plurality of first electrodes;

a plurality of second electrodes extending in the second direction and disposed adjacent to the plurality of second position detection electrodes, a portion of the plurality of second electrodes constituting the plurality of second antenna electrodes;

a plurality of second electrode connection portions connected to each of the plurality of second electrodes;

a plurality of first switches connected to the antenna circuit and each of the plurality of first electrode connection portions, the plurality of first switches being configured to switch connection between the plurality of first electrode connection portions and the antenna circuit; and a plurality of second switches connected to the antenna circuit and each of the plurality of second electrode connection portions, the plurality of second switches being configured to switch connection between the plurality of second electrode connection portions and the antenna circuit.

11. The position detecting device including an antenna function according to claim 10, further comprising:

a first ground connection portion connected to the plurality of first switches and configured to supply ground potential to a first electrode connection portion of the plurality of first electrode connection portions that is not connected to the antenna circuit; and a second ground connection portion connected to the plurality of second switches and configured to supply ground potential to a second electrode connection portion of the plurality of second electrode connection portions that is not connected to the antenna circuit.

12. A display device comprising:

the position detecting device including an antenna function according to claim 1; and a display panel layered on the position detecting device including an antenna function, the display panel including a display region in which an image is displayable, and a non-display region surrounding the display region, wherein the plurality of first position detection electrodes, the plurality of second position detection electrodes, the plurality of first antenna electrodes, and the plurality of second antenna electrodes are disposed at positions overlapping the display region.

* * * * *